US011281968B2

(12) United States Patent
Brown et al.

(10) Patent No.: US 11,281,968 B2
(45) Date of Patent: Mar. 22, 2022

(54) NEUROMORPHIC NETWORK

(71) Applicant: The University of Canterbury, Christchurch (NZ)

(72) Inventors: Simon Anthony Brown, Christchurch (NZ); Shawn Fostner, Grenoble (FR); Saurabh Kumar Bose, Christchurch (NZ)

(73) Assignee: The University of Canterbury, Christchurch (NZ)

( * ) Notice: Subject to any disclaimer, the term of this patent is extended or adjusted under 35 U.S.C. 154(b) by 969 days.

(21) Appl. No.: 15/740,791

(22) PCT Filed: Jul. 1, 2016

(86) PCT No.: PCT/NZ2016/050108
§ 371 (c)(1),
(2) Date: Dec. 29, 2017

(87) PCT Pub. No.: WO2017/003303
PCT Pub. Date: Jan. 5, 2017

(65) Prior Publication Data
US 2018/0197077 A1   Jul. 12, 2018

(30) Foreign Application Priority Data

Jul. 1, 2015   (NZ) .................................. NZ709618
May 30, 2016  (NZ) .................................. NZ720648

(51) Int. Cl.
*G06N 3/063*     (2006.01)
*G06N 3/04*      (2006.01)
*B82Y 10/00*     (2011.01)

(52) U.S. Cl.
CPC .......... *G06N 3/0635* (2013.01); *G06N 3/0445* (2013.01); *B82Y 10/00* (2013.01)

(58) Field of Classification Search
CPC combination set(s) only.
See application file for complete search history.

(56) References Cited

U.S. PATENT DOCUMENTS

| 6,242,324 | B1 * | 6/2001 | Kub ....................... B82Y 10/00 |
| | | | 257/E21.122 |
| 7,948,271 | B1 * | 5/2011 | Kuekes ............... H01L 29/0665 |
| | | | 326/104 |

(Continued)

OTHER PUBLICATIONS

Rose Mumbe Mutiso Electrical Percolation in Metal Nanowire Networks Jan. 1, 2013 pp. 86-103.*

(Continued)

*Primary Examiner* — Moazzam Hossain
(74) *Attorney, Agent, or Firm* — Michael Best & Friedrich LLP

(57) ABSTRACT

Disclosed herein is a neuromorphic percolating network (100). The network comprises a substrate (102) having at least two electrical contacts (104A, 104B); a plurality of nanoparticles (106, 108, 100) distributed on the substrate (102), at least some of the nanoparticles positioned between at least two of the at least two electrical contacts, the surface coverage of the nanoparticles within a tolerance of a percolation threshold; and at least one memristive element (116) located at least partially in a gap between nanoparticles, or groups of nanoparticles, that are not otherwise directly connected to each other, the memristive element(s) at least partially providing at least one persistent pathway (118,120) of increased activity. Disclosed herein are methods for fabricating a neuromorphic percolating network or component thereof, and neuromorphic percolating networks formed by such methods.

25 Claims, 26 Drawing Sheets

(56) References Cited

U.S. PATENT DOCUMENTS

2005/0064618 A1* 3/2005 Brown ................ H01L 29/7613
　　　　　　　　　　　　　　　　　　　　438/49
2016/0197172 A1* 7/2016 Majima ................ B82Y 10/00
　　　　　　　　　　　　　　　　　　　　257/9

OTHER PUBLICATIONS

Audrius V. Avizienis et al Neuromorphic Atomic Switch Networks Audrius Et al 2012 All.*
Abdul Sattar et al. Quantized Conductance and Switching in Percolating Nanoparticle; 2015 All.*
PCT/NZ2016/050108 International Search Report and Written Opinion of the International Searching Authority dated Nov. 15, 2016 (10 pages).
Sattar et al., "Quantized Conductance and Switching in Percolating Nanoparticle Films", Physical Review Letters, 111, Sep. 26, 2013, pp. 136808-1 to 136808-5. Fig. la, and the associated text.
A. V. Avizienis et al., "Neuromorphic Atomic Switch Networks", PLOS ONE 7(8): e42772. Aug. 6, 2012. retrieved from internet on Nov. 11, 2016: http://dx.doi.org/10.1371/journal.pone.0042772, Figs. 1,2a-ld, and Device fabrication and characterization part.

* cited by examiner

NEUROMORPHIC NETWORK

FIELD OF THE INVENTION

The invention relates to neuromorphic percolating networks, methods for preparing percolating structures for use in such networks, and the networks formed by these methods.

BACKGROUND OF THE INVENTION

Living organisms perform highly complex computational tasks with remarkable ease and with very low energy consumption. Examples of complex computational tasks include navigation, recognition, and decision-making.

The abilities of the mammalian brain are primarily due to massive parallelism combined with asynchronous computation. Millions of years of natural selection under the laws of Darwinian evolution have led to an ability to recognize and predict weather changes, ripening of crops and the presence of predatory animals, rather than an ability to 'crunch' big numbers. The human brain therefore gathers a multitude of sensory information but cannot and need not process all the data. Only the useful parts are processed and stored. Pattern recognition of a particular voice or face of a person in a crowd is immediate, an achievement that cannot be matched by even most-advanced supercomputers available today.

The astounding success of Von Neumann architecture for computers with complementary metal-oxide semiconductor (CMOS) transistors, as encapsulated in Moore's Law, is now meeting with fundamental limitations (physical transistor dimensions are approaching classical limits) and practical limitations (such as the exponential increase in research and development costs for every new process-line which are becoming uneconomical and unsustainable).

An alternate approach has been employed in artificial neural networks (ANNs). One example includes emulation of neural behavior with software. Despite many successes in fields like pattern recognition, ANNs are still inefficient in simulating the highly interconnected nature of biological neural-networks.

Another approach is to build hardware that emulates the synaptic functionality of the brain and indeed there have been a number of significant recent efforts to do this in existing CMOS technology.

These approaches have resulted in tremendous advances in neuromorphic computing. For example, IBM's TrueNorth has silicon chips containing 1 million neurons with 256 million synapses. The MOdular Neural Exploring Traveling Agent (MoNETA) from University of Boston and efforts from Hewlett-Packard (HP) consists of memristor synapses, which are relatively smaller than CMOS transistors, and show promise for the future.

These CMOS based approaches are very expensive and so it has been suggested that novel hardware approaches are required which mimic the complex biological network of neurons and synapses with nanoscale interconnects and switches. A promising approach is to build networks of memristors or other related nanoscale switches. Such networks have been shown to be promising for applications such as reservoir computing (RC), image processing and pattern recognition.

To date only a few such systems of inorganic synapses have been demonstrated, and are in early stages of development, with questions over reliability and actual functionality leading to considerable uncertainty as to whether the devices and production methods can be scaled up, and as to whether these devices can actually be used in applications such as RC.

It is an object of preferred embodiments of the present invention to address some of the aforementioned disadvantages. An additional or alternative object is to at least provide the public with a useful choice.

SUMMARY OF THE INVENTION

In one aspect the invention comprises a neuromorphic percolating network comprising a substrate having at least two electrical contacts; a plurality of nanoparticles distributed on the substrate, at least some of the nanoparticles positioned between at least two of the at least two electrical contacts, the surface coverage of the nanoparticles within a tolerance of a percolation threshold; and at least one memristive element located at least partially in a gap between nanoparticles, or groups of nanoparticles, that are not otherwise directly connected to each other, the memristive element(s) at least partially providing at least one persistent pathway of increased activity.

The term 'comprising' as used in this specification means 'consisting at least in part of'. When interpreting each statement in this specification that includes the term 'comprising', features other than that or those prefaced by the term may also be present.

Related terms such as 'comprise' and 'comprises' are to be interpreted in the same manner.

Preferably the network further comprises a plurality of memristive elements located at least partially in respective gaps between nanoparticles, or groups of nanoparticles, that are not otherwise directly connected to each other.

Preferably the at least one persistent pathway of increased activity comprises at least one persistent pathway of increased conductivity.

Preferably the at least one persistent pathway of increased activity comprises at least one persistent pathway that includes a plurality of memristive elements whose switching rate or likelihood of switching is increased.

Preferably the at least one persistent pathway of increased activity is between two of the at least two electrical contacts.

Preferably at least some of the nanoparticles are at least partially oxidised so as to limit the extent of coalescence of the nanoparticles.

Preferably at least some of the nanoparticles are conducting.

Preferably at least some of the nanoparticles have resultant diameters in the range 5 nm to 50 nm.

Preferably the nanoparticles comprise one or more of the group comprising Sn, Bi, Au, Pb, Ag, Cu and an alloy of one of more of the foregoing.

Preferably the percolation threshold comprises 0.68, the tolerance for the surface coverage of the nanoparticles comprising a range of 0.40 to 0.70.

Preferably the tolerance for the distribution of the nanoparticles comprises a range of 0.5 to 0.68.

Preferably the tolerance for the surface coverage of the nanoparticles comprises a range of 0.55 to 0.68.

Preferably the percolation threshold comprises 0.68, the tolerance for the surface coverage of the nanoparticles comprising a range of 0.62 to 0.72.

Preferably the at least one memristive element comprises at least one atomic scale conducting wire.

Preferably the atomic wire(s) are formed in response to a voltage applied between the at least two electrical contacts, the voltage comprising a voltage ramp, a voltage pulse, or a series of voltage pulses.

Preferably the atomic wire(s) are formed in response to a current applied between the at least two electrical contacts.

Preferably the atomic wire(s) are formed in response to electric field driven migration, electric field driven evaporation, electrochemical reduction, and/or electrochemical oxidation.

Preferably the substrate is non-conducting, insulating, or semi-conducting.

Preferably at least part of the substrate comprises a substantially planar surface.

Preferably at least part of the substrate comprises a substantially curved surface.

Preferably at least part of the substrate has an RMS surface roughness of less than 1 nm.

Preferably the memristive elements comprise gaps which are tunnel gaps providing a low conductance state prior and atomic scale wires in the tunnel gaps providing a high conductance state.

Preferably the at least one memristive element comprises one or more of the group comprising: Ag/AgS electrochemical switches, switching molecules, and standard metal oxide memristor switching elements devices.

Preferably the nanoparticles are functionalised with molecules.

Preferably the molecules are able to switch between two states with well defined and distinct resistances.

Preferably the molecules comprise one or more of the group comprising: azobenzenes, rotaxanes, and other molecular switches.

Preferably at least some of the nanoparticles comprise Ag or Cu particles and are at least partially sulphidised.

Preferably at least some of the atomic scale conducting wires comprise atomic scale silver or copper wires.

In another aspect the invention comprises a method of fabricating a neuromorphic percolating network, or component thereof, the method comprising providing a substrate having at least two electrical contacts; locating the substrate in a vacuum chamber, the vacuum chamber having a controlled partial pressure of air or oxygen and controlled relative humidity; and depositing a plurality of nanoparticles on the substrate, at least some of the nanoparticles positioned between at least two of the at least two electrical contacts, the surface coverage of the nanoparticles within a tolerance of a percolation threshold, at least one memristive element located at least partially in a gap between nanoparticles, or groups of nanoparticles, that are not otherwise directly connected to each other, the memristive element(s) at least partially providing at least one persistent pathway of increased activity.

Preferably the pressure of air in the vacuum chamber is in the range $1\times10^{-6}$ Torr to $1\times10^{-3}$ Torr.

Preferably the pressure of air in the vacuum chamber is in the range $5\times10^{-6}$ to $100\times10^{-6}$ Torr.

Preferably the pressure of air in the vacuum chamber is in the range $10\times10^{-6}$ to $50\times10^{-6}$ Torr.

Preferably relative humidity of the air in the vacuum chamber is greater than 30%.

Preferably relative humidity of the air in the vacuum chamber is greater than 60%.

Preferably the nanoparticles are deposited onto the substrate from a vapour or a beam.

Preferably the nanoparticles are formed by inert gas aggregation and are entrained in a beam that is directed at the substrate.

Preferably the deposited nanoparticles have diameters in the size range 5 to 50 nm.

Preferably the deposited nanoparticles have diameters in the size range 5 to 12 nm.

Preferably the resultant particle size is in the range 15-50 nm.

Preferably the method further comprises monitoring the electrical conductance of the device so as to achieve the required surface coverage of the nanoparticles.

Preferably the method further comprises controlling the surface coverage to be within a tolerance of a percolation threshold.

Preferably the tolerance comprises 10% of the percolation threshold.

Preferably the morphology of the nanoparticle network is such that it provides a resistance in series with and/or in parallel with the sites at which switching occurs.

Preferably the series resistance is smaller than 12 k$\Omega$.

Preferably the series resistance is in the range 2 to 6 k$\Omega$.

Preferably the parallel resistance is greater than 1 k$\Omega$.

Preferably the method further comprises connecting at least part of the neuromorphic network to an electrical circuit that includes a current limiting device.

Preferably the current limiting device comprises a series resistor.

Preferably the series resistor is in the range 0.5 to 10 k$\Omega$.

Preferably the method further comprises at least partially covering at least some of the particles with an inert material so as to stabilise the particles and/or the network of particles.

Preferably the inert material comprises a metal oxide.

Preferably the metal oxide comprises $Al_2O_3$.

Preferably the method further comprises controlling the width of the memristive elements by the voltage pulse.

Preferably the method further comprises controlling the width of the memristive elements by the voltage pulse so as to achieve quantised conductance Preferably the method further comprises forming the memristive elements in response to a voltage ramp or a voltage pulse.

Preferably the method further comprises forming the memristive elements in response to a series of voltage pulses.

Preferably the method further comprises forming the atomic scale wires by controlling the amplitude of the voltage pulses and/or the time between pulses.

Preferably the applied voltage is in the range 0.5 to 10 V.

Preferably the applied voltage is in the range 1 to 5 V.

Preferably the applied voltage is a voltage pulse having a width smaller than 30 s.

Preferably the applied voltage is a voltage pulse having a width in the range 1 to 10 s.

In another aspect the invention comprises a neuromorphic percolating network formed by the methods disclosed above.

The invention in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

In addition, where features or aspects of the invention are described in terms of Markush groups, those persons skilled in the art will appreciate that the invention is also thereby described in terms of any individual member or subgroup of members of the Markush group.

As used herein, '(s)' following a noun means the plural and/or singular forms of the noun.

As used herein, the term 'and/or' means 'and' or 'or' or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

Although the present invention is broadly as defined above, those persons skilled in the art will appreciate that the invention is not limited thereto and that the invention also includes embodiments of which the following description gives examples.

BRIEF DESCRIPTION OF THE DRAWINGS

Preferred forms of the neuromorphic percolating network will now be described by way of example only with reference to the accompanying figures in which.

DETAILED DESCRIPTION

Figure 1:
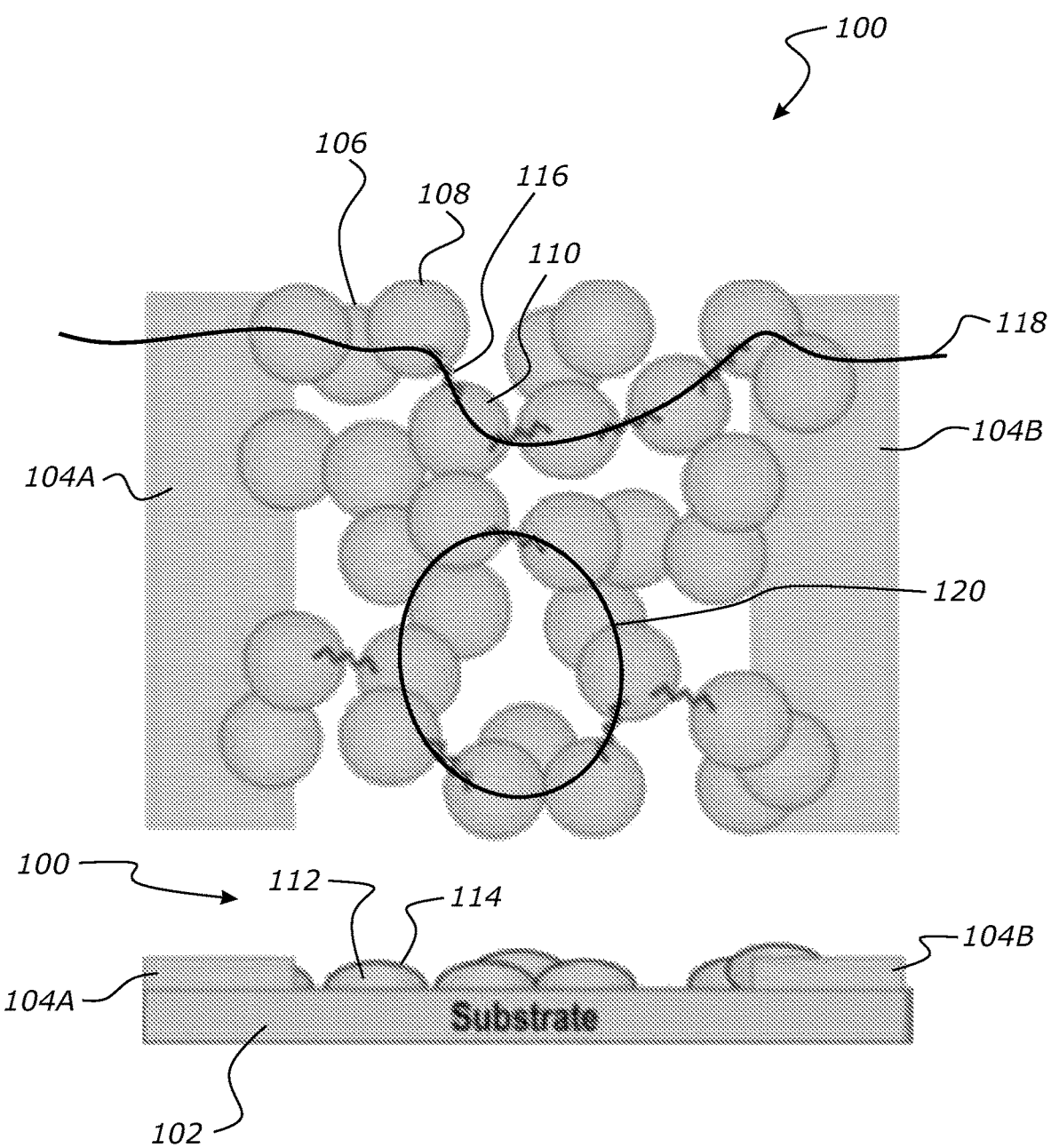
FIG. 1 shows an example of a neuromorphic percolating network.

'Atomic scale' as used herein in relation to an atomic scale conducting wire represents an average width of a wire of between 1 and 5 atoms, preferably 1 to 3 atoms.

'Coverage' or 'Surface Coverage' as used herein represents a fraction of the area of the substrate that is covered by deposited particles.

A 'percolation threshold' is the least occupancy of the available sites in percolation theory at which a connected structure exists which spans the system and/or allows electrical conduction across the system.

'Memristor' as used herein means an electrical device that exhibits two conductance states, the state at any given time resulting from the previous history of the inputs. Memristive devices include, but are not limited to, switching devices based on movement of impurities/defects in semiconducting or insulating matrices (e.g. oxygen vacancies in $TiO_2$), atomic switches (either those relying on the electrochemical reduction of $Ag_2S$ or $Cu_2S$ to form atomic scale silver or copper wires within a matrix, or those in which an atomic scale wire is formed in a tunnel gap (e.g. a Sn or Ag wire)), molecular switches, or other memristive devices based on, for example, polymers, Indium Zinc Oxide, and superconductors.

'Neuromorphic structure' as used herein means a structure that resembles that of the brain, and in particular that the structure comprises a complex network of elements that can be identified with the neurons and synapses present in the brain, and especially structures in which conducting pathways are identified with neurons and memristive switching elements with synapses.

'Neuromorphic behaviour' as used herein has the following meaning—having brain-like characteristics, and in particular that the electrical characteristics of an electronic device change in response to electrical inputs due to switching of synaptic elements within a complex network of neuronal elements. Examples include but are not limited to feed-forward and recurrent behaviour (as in ANNs), potentiation (defined herein), unsupervised learning (synaptic weights/strengths are self-adjusting) or RC (trained weights at output nodes only).

'Potentiation' as used herein has the following meaning—creation of electrical connections within a network as a result of electrical inputs and resulting in increased conductivity between a pair of contacts or increased activation or conductivity of synaptic/memristive elements along one or more paths in the network.

'Artificial neural networks (ANNs)' as used herein has the following meaning—a network of trained, interconnected 'neurons' that map inputs to outputs via a network of 'synapses'. An ANN is typically but not exclusively implemented in software, and the synapses are typically but not exclusively implemented via the 'weights' of the connections between neurons.

'Reservoir computing' (RC) as used herein has the following meaning—Computing based on an artificial neural network in which the network ('reservoir') contains synapses that are not explicitly trained but instead independently adjust their values or functionality according to the external inputs in a way that may be time dependent. The reservoir is a complex network whose operation is 'intrinsic' to its components, which may for example be memristors, and internal connectivity. If required, explicit training is accomplished by 'readout' synapses sitting at the edge of the network.

FIG. 1 shows a plan view and a side view respectively of an embodiment of a neuromorphic percolating network 100. As shown more particularly in FIG. 1, the network includes a substrate 102. The substrate 102 is provided with at least two electrical contacts. Two such electrical contacts are shown at 104A and 104B respectively.

The substrate 102 is shown in FIG. 1 as comprising a substantially planar surface. In typical embodiments the substrate is part of a silicon wafer coated with a surface layer of silicon dioxide or silicon nitride. In an embodiment the substrate 102 alternatively or additionally comprises a substantially curved surface. In typical embodiments the substrate comprises plastic or glass, or a moulded surface. In various embodiments the substrate 102 is non-conducting, insulating, or semi-conducting. In an embodiment the substrate 102 has an RMS surface roughness of less than 1 nm.

The electrical contacts 104 are typically defined by shadow mask or lithographic processes, including the step of evaporation of the metal onto the substrate. Typically a sticking layer such as NiCr or Ti is first evaporated followed by an inert material such as Au.

FIG. 1 shows a plurality of nanoparticles distributed on the substrate 102. The nanoparticles are shown for example at 106, 108, 110, and 112. The nanoparticles are shown distributed on the substrate 102 between electrode 104A and electrode 104B. In an embodiment substantially all of the nanoparticles are positioned between electrodes 104A and 104B. In an embodiment at least some of the nanoparticles are positioned between electrodes 104A and 104B.

The network 100 has a percolation threshold. Percolation theory involves an understanding of the formation of connected structures of randomly occupied sites.

Where there is a regular lattice of sites this is known as site percolation. Where there is no regular lattice of sites this is known as continuum percolation. It is assumed that a system of randomly deposited nanoparticles (wherein nanoparticles are able to land on top of previously deposited particles) is well represented by continuum percolation theory (which describes a system comprising penetrating/overlapping discs). In an embodiment the percolating network 100 is essentially two-dimensional. In an alternative embodiment of the percolating network is substantially three-dimensional, occupying a volume rather than a planar surface.

In an embodiment shown in FIG. 1 the nanoparticles are randomly distributed on the substrate 102. Nanoparticles 106 and 108 are examples of nanoparticles that are directly connected to each other and form part of a group of nanoparticles. Nanoparticles 108 and 110 are examples of nanoparticles that are not directly connected to each other because they are in different groups.

In order to optimise the neuromorphic properties of the device, the surface coverage of nanoparticles is selected to be within a tolerance of the percolation threshold. In an embodiment the percolation threshold of the network 100 is equal to a surface coverage of 0.68. In an embodiment the tolerance for the surface coverage of the nanoparticles comprises a range of 0.40 to 0.70. In an embodiment the tolerance for the surface coverage of the nanoparticles comprises a range of 0.50 to 0.68. In an embodiment the tolerance for the surface coverage of the nanoparticles comprises a range of 0.55 to 0.68. In an embodiment the tolerance for the surface coverage of the nanoparticles comprises a range of 0.62 to 0.72.

In alternative embodiments the percolation threshold is a property of the physical system and may take other values, and the tolerance for the distribution of nanoparticles comprises a range of ±10%. For example in an embodiment of a three-dimensional system the percolation threshold is a fractional occupancy of the volume which is found to be in the range ~0.15 to 0.40 depending on the interactions between the particles. Typical cubic arrangements of particles have a threshold fractional occupancy of 0.16 to 0.20 and the tolerance may be approximately 0.02.

In an embodiment the network 100 includes at least one memristive element located at least partially in a gap between nanoparticles or groups of nanoparticles. FIG. 1 for example shows a memristive element 116 positioned between nanoparticle 108 and nanoparticle 110. Nanoparticles 108 and 110 are not otherwise directly connected to each other. However, the memristive element 116 is one of a plurality of memristive elements adapted to permit formation of at least one persistent pathway of increased activity in the network 100. In an embodiment, the pathway(s) are persistent in the sense that the pathway(s) are physical structures that remain in place in the absence of electrical or other activity within the network 100. In an embodiment the pathway(s) are persistent in the sense that there is an increase in activation of the memristive elements such that their rate of switching or potential to be switched is enhanced.

In an embodiment the persistent pathway comprises a plurality of memristive elements in the form of atomic scale conducting wires. The atomic scale wires are located at least partially in respective gaps between nanoparticles or groups of nanoparticles that are not otherwise connected to each other. For example, nanoparticles 108 and 110 are connected in an embodiment by a plurality of atomic scale conducting wires. In an embodiment there are multiple gaps between nanoparticles or groups of nanoparticles. In an embodiment there are multiple atomic scale wired located at least partially within the gaps.

Nanoparticles or groups of nanoparticles are connected in an embodiment by atomic scale conducting wires so as to form a pathway in the network. One such pathway is shown at 118. The pathway 118 extends between electrical contacts 104A and 104B. In an embodiment the network 100 includes recurrent pathways. One such pathway is shown at 120. Recurrent pathways do not extend between electrical contacts 104A and 104B. In an embodiment the network 100 includes a combination of pathways that extend between electrodes 104A and 104B and pathways that do not extend between electrodes 104A and 104B.

In an embodiment the nanoparticles are substantially metallic, or are metallic particles with at least a surface coating of an oxide. In an embodiment the nanoparticles are each formed from tin (Sn), bismuth (Bi), gold (Au), silver (Ag), lead (Pb), or copper (Cu) particles, or an alloy of one or more of the foregoing. In an embodiment the nanoparticles are each formed from the same material. In an embodiment the nanoparticles are formed from an alloy of two or more of the foregoing materials. In an embodiment the alloy is substantially homogeneous. In an embodiment the nanoparticles are formed from two or more different examples of the foregoing materials.

In an embodiment at least some of the nanoparticles are at least partially oxidised. As shown in FIG. 1, nanoparticle 112 shows a thin or partial oxide layer 114. The oxide layer 114 limits the ability of nanoparticle 112 to coalesce with neighbouring nanoparticles. Coalescence of nanoparticles is more particularly described below.

In an embodiment the nanoparticles are each formed from silver (Ag) or copper (Cu) particles. At least some of these nanoparticles are at least partially sulphidised. This sulphidisation occurs additionally or as an alternative to oxidisation. In an embodiment the nanoparticles are at least partially oxidised. In another embodiment the nanoparticles are at least partially sulphidised. In a further embodiment the nanoparticles are at least partially oxidised and at least partially sulphidised.

Figure 2:
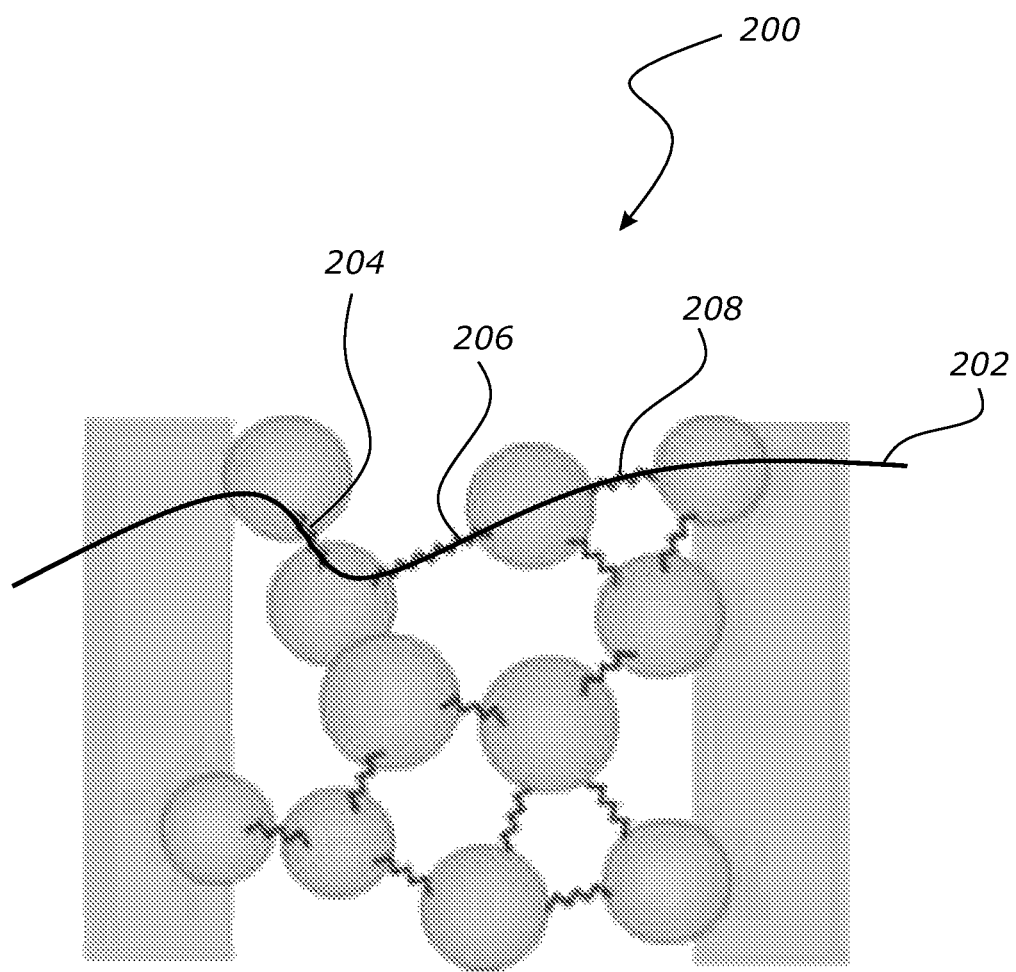
FIG. 2 shows the network of FIG. 1 following coalescence.

FIG. 2 shows an example of a coalesced neuromorphic percolating network 200 that results from coalescence of a network of as-deposited nanoparticles 100 from FIG. 1. The deposited nanoparticles coalesce to form resultant nanoparticles. The larger particles in FIG. 2 result from coalescence of the groups of particles in FIG. 1, leaving larger tunnel gaps between the particles.

In an embodiment at least some of the deposited nanoparticles have respective diameters in the range 5 nm to 12 nm when deposited on the substrate 102. These sizes are referred to as deposited diameters in this specification and claims. Once deposited, the nanoparticles are subjected to coalescence causing groups of nanoparticles to bond together and merge. At least some of these resultant nanoparticles have respective diameters in the range 5 nm to 50 nm. These sizes are referred to as resultant diameters in this specification and claims.

The nanoparticles in FIG. 2 are larger than the nanoparticles in FIG. 1 but they are spaced further apart from each other. These spaces can cause gaps in the conducting paths. This in turn can lead to no conduction or tunneling conduction or conduction via pathways of memristive elements. In an embodiment the conduction is substantially only via persistent or activated pathways of memristive elements. For example, persistent pathway 202 is formed via memristive elements 204, 206 and 208.

Figure 3:
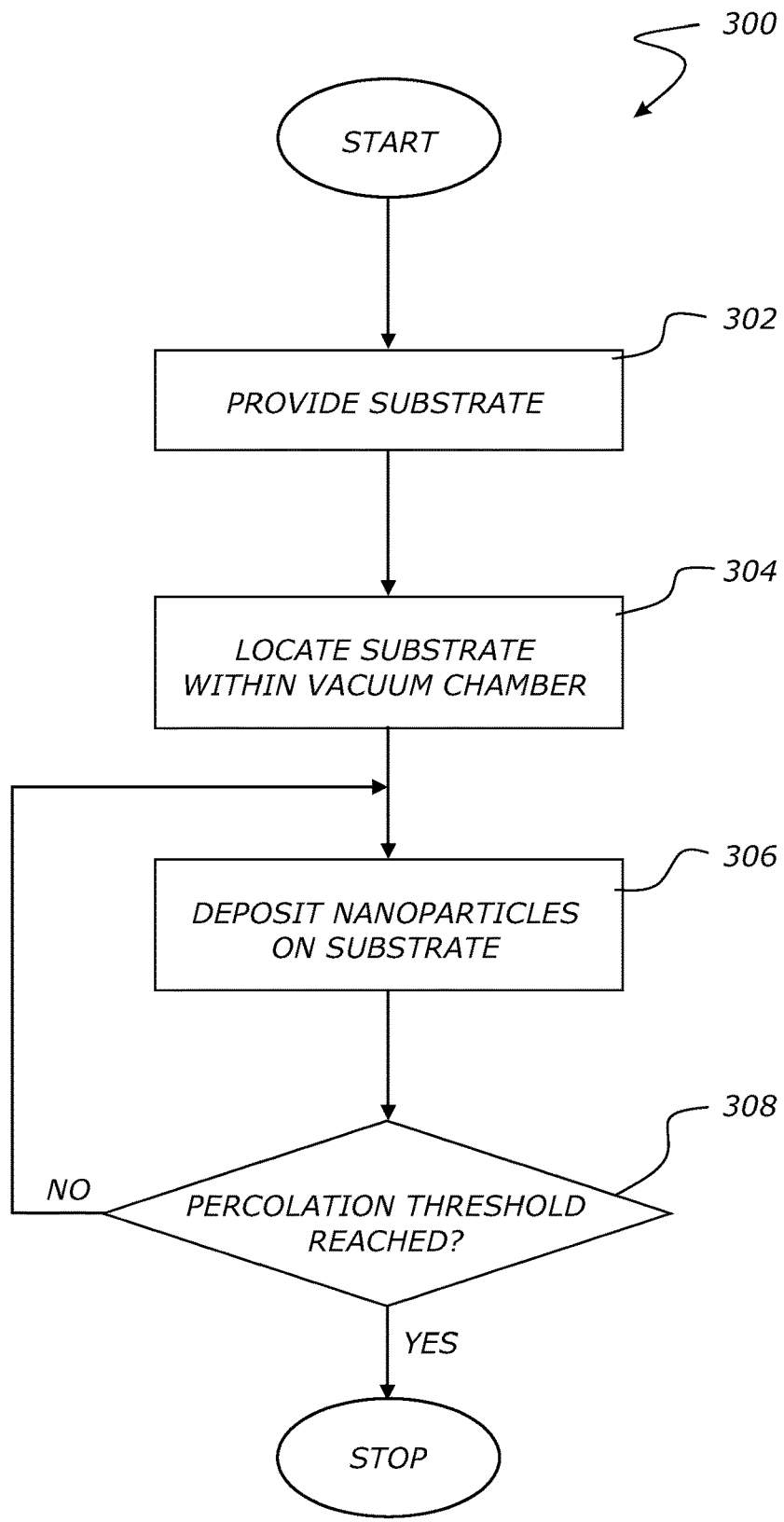
FIG. 3 shows a method for fabricating a percolating structure for use in the network of FIG. 1 or 2.

FIG. 3 shows an embodiment method 300 for neuromorphic percolating network fabrication. A substrate, such as the substrate 102 disclosed above, is provided 302. The substrate is located 304 within a vacuum chamber. Nanoparticles are deposited 306 from a beam of particles generated by inert gas aggregation in a vacuum system. Particles are deposited onto the substrate, substantially between electrical contacts, in a high vacuum chamber. The particles are deposited until a percolation threshold 308 is reached.

The method described here provides a narrow deposited nanoparticle size distribution. When coupled with appropriate choice of deposited nanoparticle material, substrate and contact materials, deposition temperature, environmental conditions (especially vacuum quality, humidity and oxygen concentration) and in-situ electronic transport measurements this allows precise control over the resultant particle surface coverage, near the percolation threshold.

In an embodiment, Tin (Sn) deposited nanoparticles with mean diameter ~8.5 nm are deposited onto thin Au/NiCr electrodes (heights typically smaller than 50 nm), with active area of 100 μm×300 μm. The Sn nanoparticles are deposited at room temperature which means that ordinarily the surface atoms have sufficient mobility to allow coalescence.

And this coalescence process, occurring at random spatial position can effectively increase as well as decrease the cumulative number of percolating conduction pathways.

The high degree of coalescence leads to the formation of grains with sizes ~20 nm. For samples poised near to the percolation threshold the coalescence can lead to the loss of conducting pathways through the film, because neighbouring particles that are initially joined by a fragile connection are pulled apart due to coalescence with other neighbours.

Figure 4:
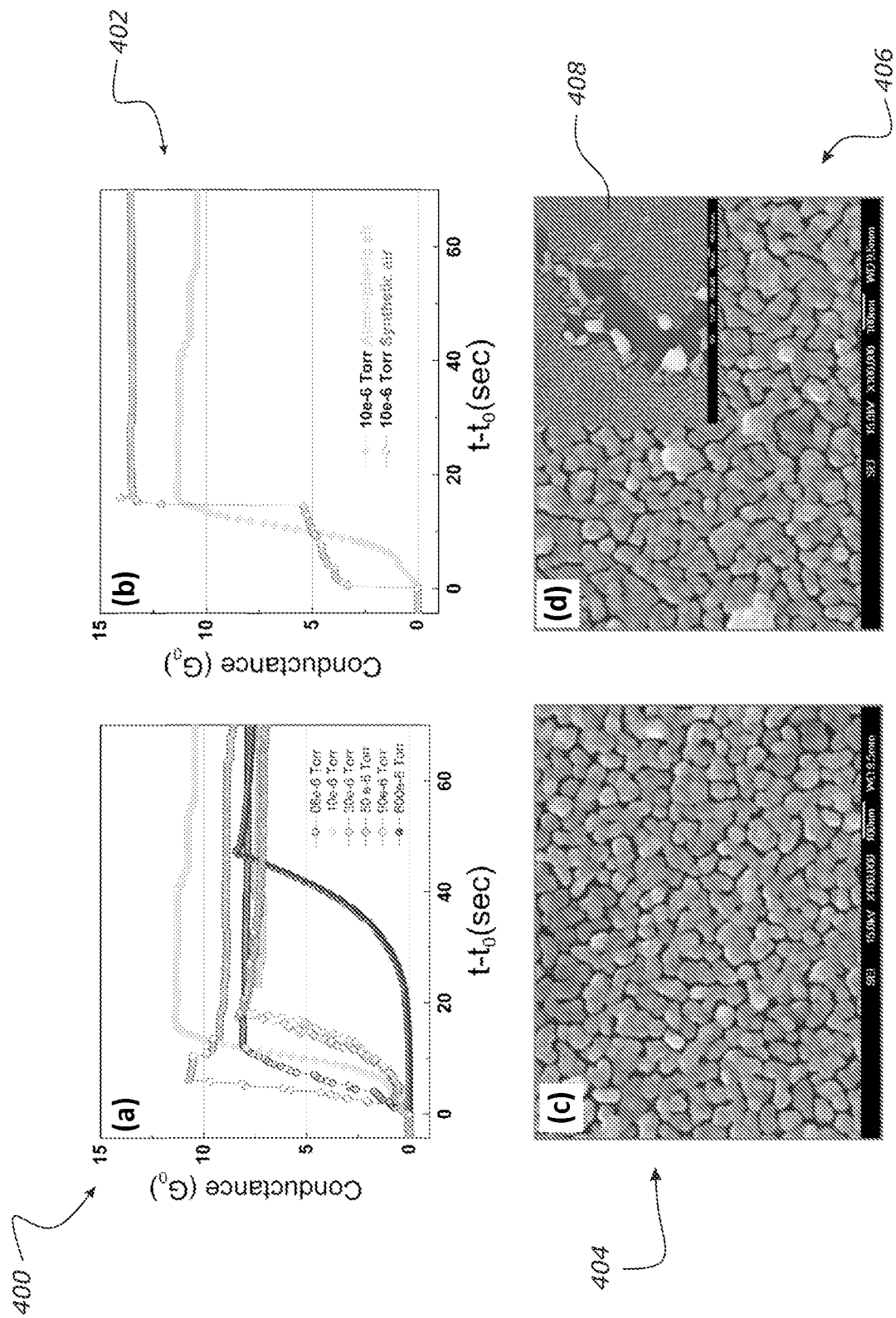
FIG. 4 illustrates onset of conductance and morphology of samples prepared with differing partial pressures of atmospheric air and synthetic air.

FIG. 4 shows at 400 variation of onset of conductance with increase in partial pressure $P_{dep}$ during nanoparticle deposition. The $P_{dep}$ is varied by controlled inlet of atmospheric air into deposition chamber. The time to denotes the appearance of a non-zero conductance i.e. G≠0. More specifically, to denotes the appearance of a conductance that is higher than the leakage conductance between the contacts in the absence of nanoparticles.

In an embodiment, a controlled leak via a needle-valve is used to vary the pressure. An increase in partial pressure generally leads to a broader onset i.e. it requires a longer time after the initial observation of a non-zero conductance to reach any given conductance value. The onset for $P_{dep}=10\times10^{-6}$ Torr extends for a minute in comparison to the ~10 s of the deposition at the base pressure (BP) of the deposition chamber which is ~$6\times10^{-6}$ Torr. As described below, this oxidation procedure stabilizes the morphological structure.

FIG. 4 shows at 402 that use of dry synthetic air to create the same partial pressure ($10\times10^{-6}$ Torr) produces different onset characteristics and sample stability as compared with ambient air.

Although the partial pressure and thus the relative oxygen content is similar for both ambient air and synthetic air, the onset is remarkably different, with the deposition done with synthetic air exhibiting steps in G.

FIG. 4 shows at 404 a scanning electron micrograph of the sample shown at 400 involving ambient air.

FIG. 4 shows at 406 a scanning electron micrograph of the sample shown above at 402 involving synthetic air. Shown at 408 is the damage to the films caused by high voltages that lead to disconnections in the films.

The underlying microstructure of the sample with synthetic air shows a higher level of coalescence in comparison to the deposited in ambient air.

One reason for the difference between these samples is the relative humidity in the different types of air (RH~80% for the atmospheric air, RH=0% for the synthetic air) and the effect that the humidity has on the oxidation process. Although, the microstructure in 404 and 406 has only very subtle differences, these differences become very important as the nanoparticles system is poised near the percolation threshold and the electronic conduction paths available in the structure contain tunnel-gaps which are critical for the formation and destruction of new atomic scale wires.

Figure 5:
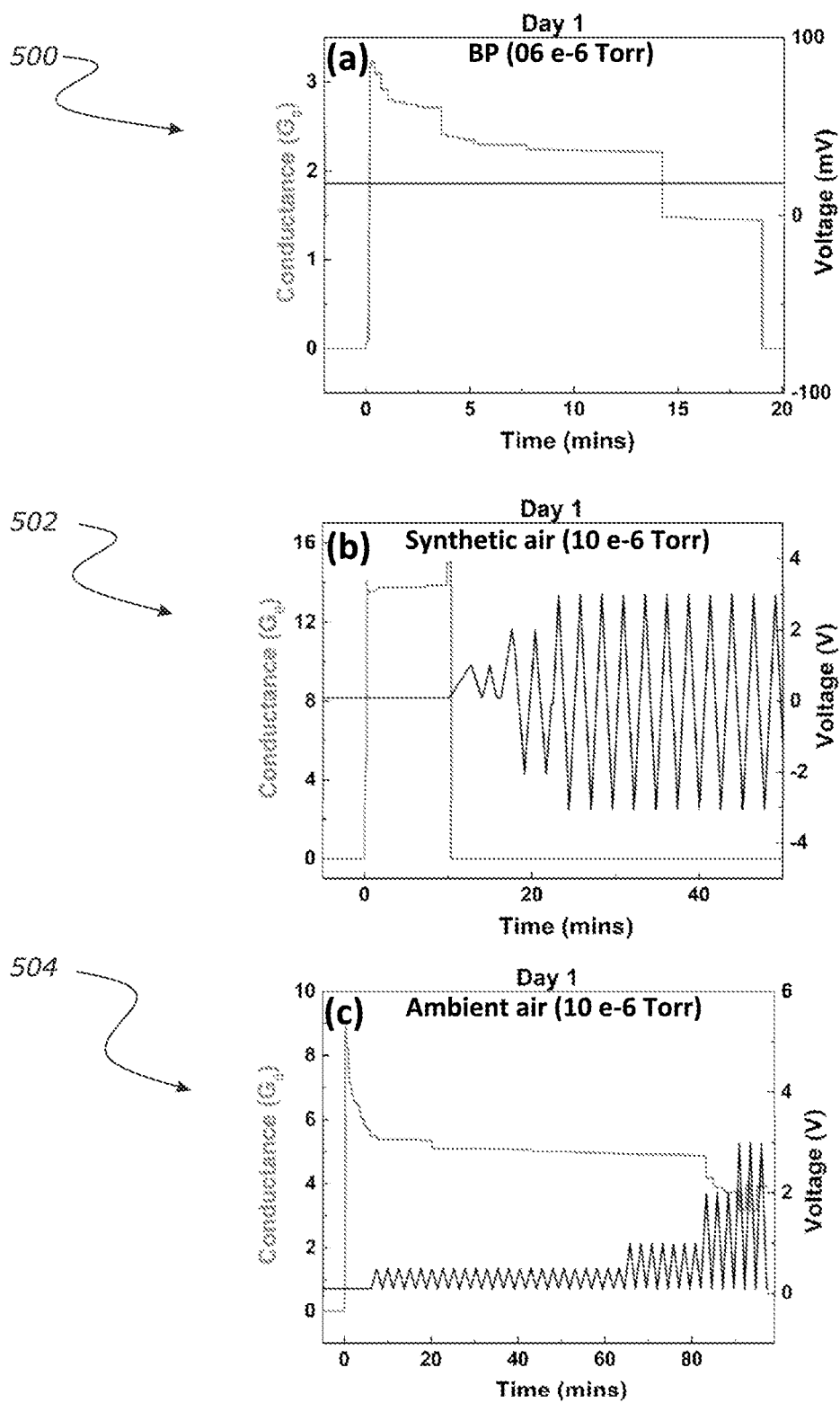
FIG. 5 shows the evolution of conductance of sample after deposition using differing partial pressures of atmospheric air and synthetic air.

FIG. 5 shows at 500 the evolution of the conductance of a sample after deposition at BP which resulted in an initial G~3 $G_0$. The high mobility of the Sn atoms leads to continued step-wise or discrete decreases in G, and eventually G→0. This means that there is a gap in each conduction path that was previously available. This indicates that coalescence induced annihilation of the percolating paths.

The voltage bias applied throughout this process is very small (20-100 mV). These small voltages are sufficient to monitor the state of the sample, but do not cause significant changes in conductance.

FIG. 5 shows at 502 a sample prepared in synthetic (dry) air with $P_{dep}=10\times10^{-6}$ Torr. This indicates that a small voltage sweep quickly causes an opening of a gap in each connected path, again leading to G=0. Higher voltage amplitudes do not cause a reconnection of the paths.

FIG. 5 shows at 504 a sample fabricated with a similar partial pressure of atmospheric air ($P_{dep}=10\times10^{-6}$ Torr and RH~80%). The sample is stable and the conductance shows discrete switching between low and high G values. The microstructure of such samples does not show any molten regions 406 in SEM micrographs. This sample exhibits multiple switching events under triangular voltage sweeps. Subsequent experiments (see FIG. 5 and other data discussed below) show that such samples can exhibit reproducible switching behaviour for months.

Figure 6:
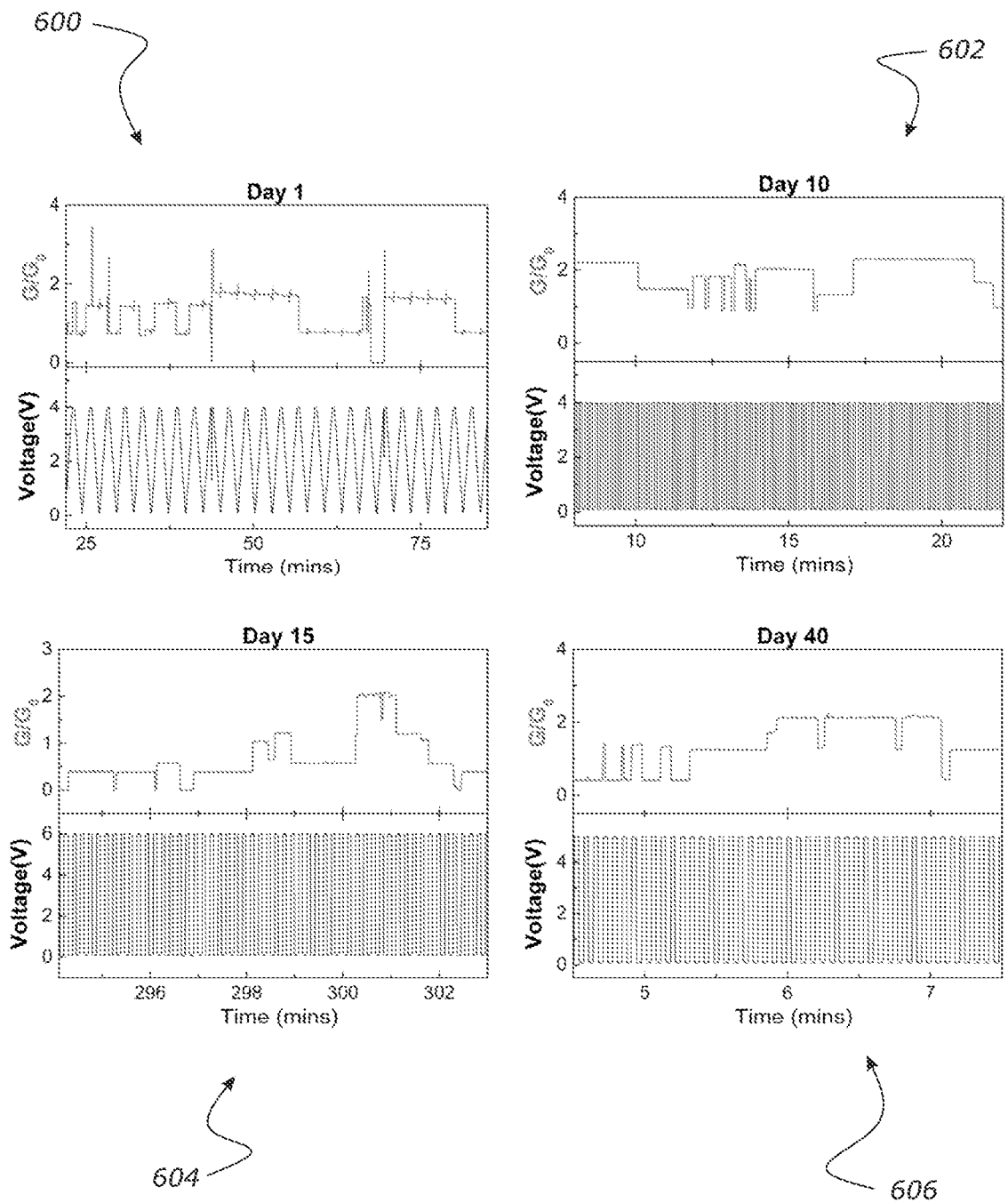
FIG. 6 shows the post-deposition conductance of a sample prepared with ambient air with optimum moisture content stimulated with voltage sweeps and square voltage pulses over time.

FIG. 6 shows the effect of samples fabricated in high humidity (RH~80%) atmospheric air being stimulated with voltage sweeps and square voltage pulses over many weeks. Such samples show reproducible switching behaviour over periods of more than a month.

Switching events on the 1st, 10th, 15th and 40th days are shown at 600, 602, 604, and 606 respectively. The conductance switches between multiple conductance states but remains in the range 1-3 $G_0$. As can be seen G→0 at multiple points, but the applied electric field induces reconnections that lead to a conductance that is still in the range 1-3 $G_0$.

Samples (more than 10) fabricated in high humidity conditions (RH⩾80%) with ambient air have been tested in this way for periods of up to 2 months and exhibit continuous and stable switching.

Samples prepared with high RH appear to exhibit reproducible switching behaviour for periods of at least 2 months. Described below are samples prepared in a more controlled environment using dry synthetic air coupled with custom-built humidifier (bubbler) which exhibit similar stability if RH⩾60%. Both these samples were stable for 9 weeks (>2 months), before being taken out of the measurement chamber, whereas no sample prepared with RH<50% exhibited such stability.

Figure 7:
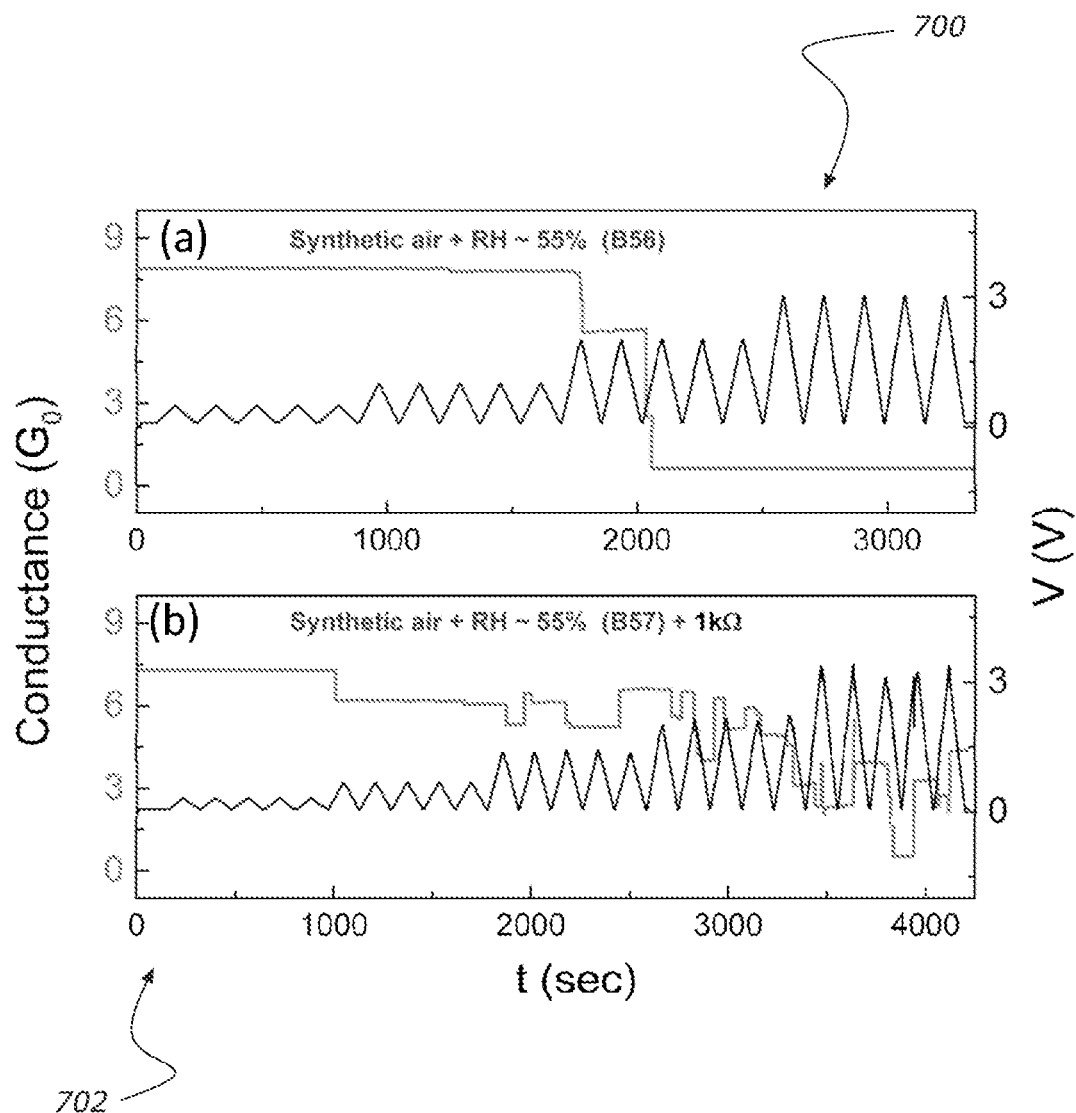
FIG. 7 shows a post-deposition voltage sweep for samples prepared with synthetic air with sub-optimum moisture content.
Figure 8:
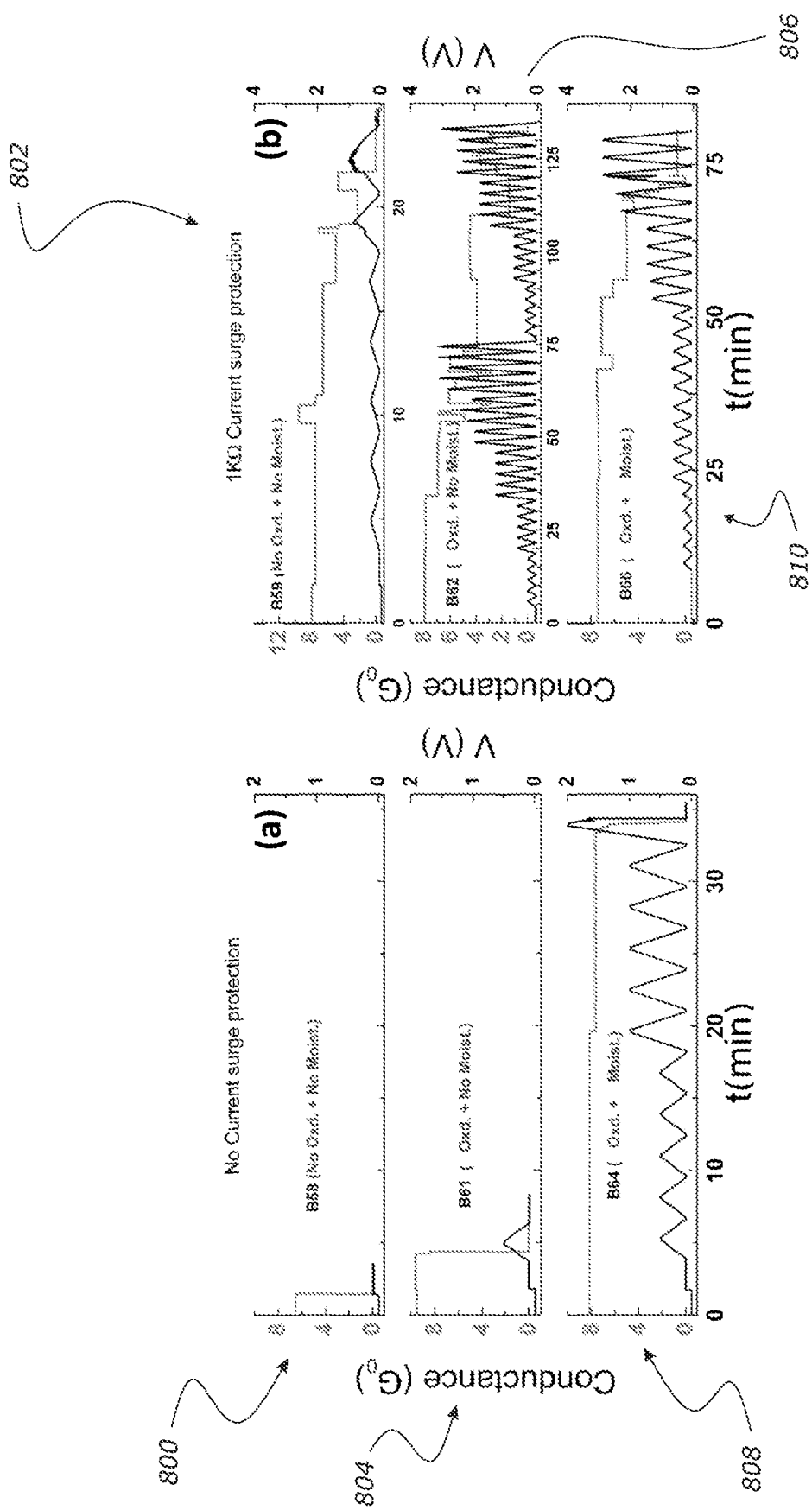
FIG. 8 shows the effect of current surge protection.

Samples prepared in humid ambient air appear to exhibit long-term reproducibility of the switching behaviour that is desirable for device applications. FIGS. 7 and 8 also show that samples prepared in synthetic/dry air do not show the same longevity.

Disclosed below are data on the effect of the moisture content, leading to a description of a method for introducing sufficient moisture into dry air so as to also achieve long-term reproducible switching behaviour that is comparable to that obtained in high RH atmospheric air.

FIG. 7 shows a post-deposition voltage sweep for samples prepared with synthetic air with sub-optimum moisture content of RH~55%. These samples were prepared in synthetic air with an in-line humidifier and required an in-series current limiting resistor to produce stable conductance switching. Moreover, these samples exhibited stable switching behaviour only for a few days and thus were significantly less stable than the samples shown in FIG. 6. This clearly indicates that it is not only moisture, but a critical amount of moisture, that is required in order to stabilize the switching behaviour. Further samples prepared in synthetic air with a higher RH (~60%) exhibit similar ultra-stable switching behaviour as in figure numbers FIGS. 10 to 15 for months.

Shown at 700 is conductance data for a sample prepared with less than optimum moisture content (RH⩽55%) in synthetic air. The sample was unstable with initial voltage sweeps causing G→0 at ~2V. There are only network disconnections indicated by G↓ events. Post-measurement SEM micrographs show an abundance of melted pathways.

Shown at 702 is conductance data for a sample made under identical conditions, but measured with a current-limiting 1 kΩ resistor in series with the sample. The sample shows presence of more stable conductance switching events: both G↓ and G↑ events were observed for several days. The current-limiting resistor prevents breaking of connections and switching behaviour was observed with voltage sweeps and pulses.

Figure 9:
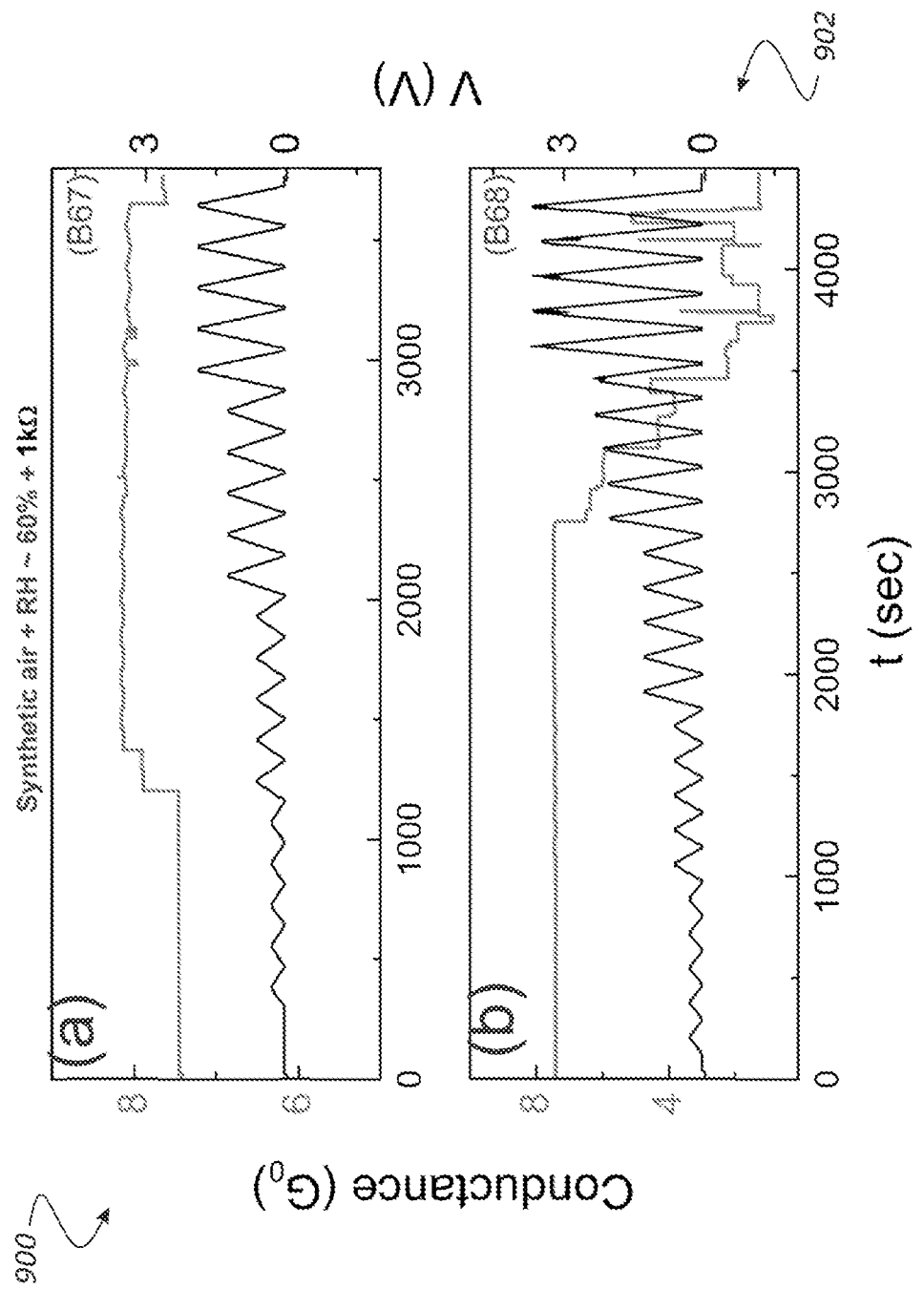
FIG. 9 shows stable switching behaviour for samples prepared with synthetic air with optimum moisture content.

The samples prepared with wet synthetic air with RH~55% are only partially stabilized, and this provides an opportunity to demonstrate an additional method for stabilising the switching behaviour in these devices. FIGS. 8 and 9 show that by providing a current-limiting resistor (1 kΩ) in series with the device, the switching behaviour is stabilized. In fact this sample exhibited stable switching for only few days.

FIG. 8 shows the importance of current surge protection in the form of 1 kΩ in-line resistor.

Samples prepared without oxidation or moisture are unstable in the absence of current protection 800 and with the current surge protection 802. G→0 on application of 0.1V (no resistor) and 1V (with resistor). Behaviour for a sample prepared with dry oxygen is only slightly more stable as G→0 at 1V with no resistor 804 and 3V with resistor 806. Samples prepared in oxygen and partial humidity (~55%) are most stable, as shown at 808 and 810 respectively. For ultra-stable conductance switching, higher moisture content of RH⩾60%) is required.

FIG. 8 shows the comparison of samples prepared with no oxidation and no moisture, oxidation and no moisture, and oxidation and moisture, and both with and without a current limiting resistor in series with the sample during the voltage ramps. It appears that the series resistor limits the current that can flow through the critical connections in the percolating network, and hence prevents destruction of atomic scale wires that would otherwise occur due to electromigration.

FIG. 9 shows promising stable switching behaviour on 1st voltage sweeps from samples prepared with synthetic air with optimum moisture content of RH⩾60%. These two samples 900 and 902 show conductance switching for more than 9 weeks without in-line 1 kΩ current-limiting resistor.

Figure 20:
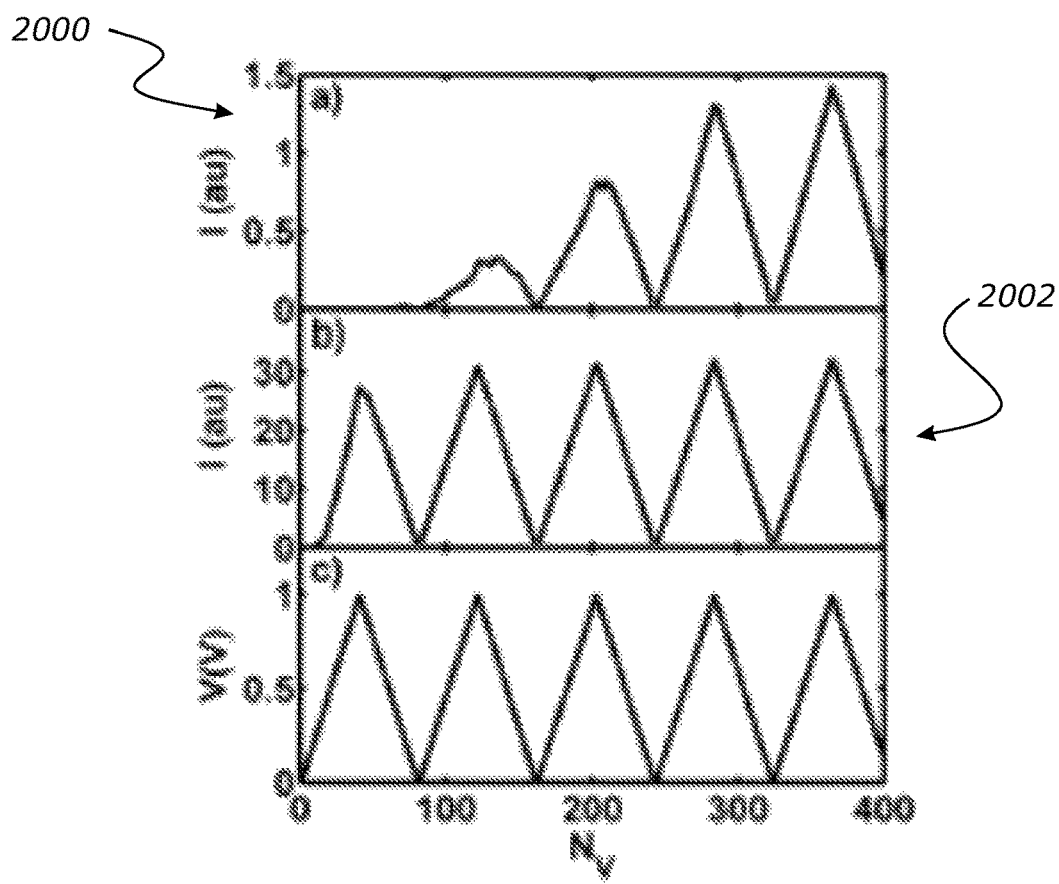
FIG. 20 shows current through a percolating system of nanoparticles in response to applied sawtooth voltage.

As disclosed above, higher moisture content ambient air (RH⩾80%) shows the most stable switching behaviour. Synthetic air with sub-optimum RH content of 55% is only partially stable. Increasing the moisture content to just above 60% for samples prepared with synthetic air, as shown in FIG. 20 stabilises the sample. Although, the voltage sweep is done with an in-line 1 kΩ resistor, subsequent sweeps and voltage pulses without the resistor showed stable switching for more than two months.

Disclosed above is evidence of reproducible long-term switching behaviour in percolating assemblies of nanoparticles that are stabilized by oxidation in a high humidity atmosphere, indicating that moisture is important to the oxidation process. Furthermore, provision of a current limiting resistor can enhance the longevity of samples that would otherwise have limited stability.

Figure 10:
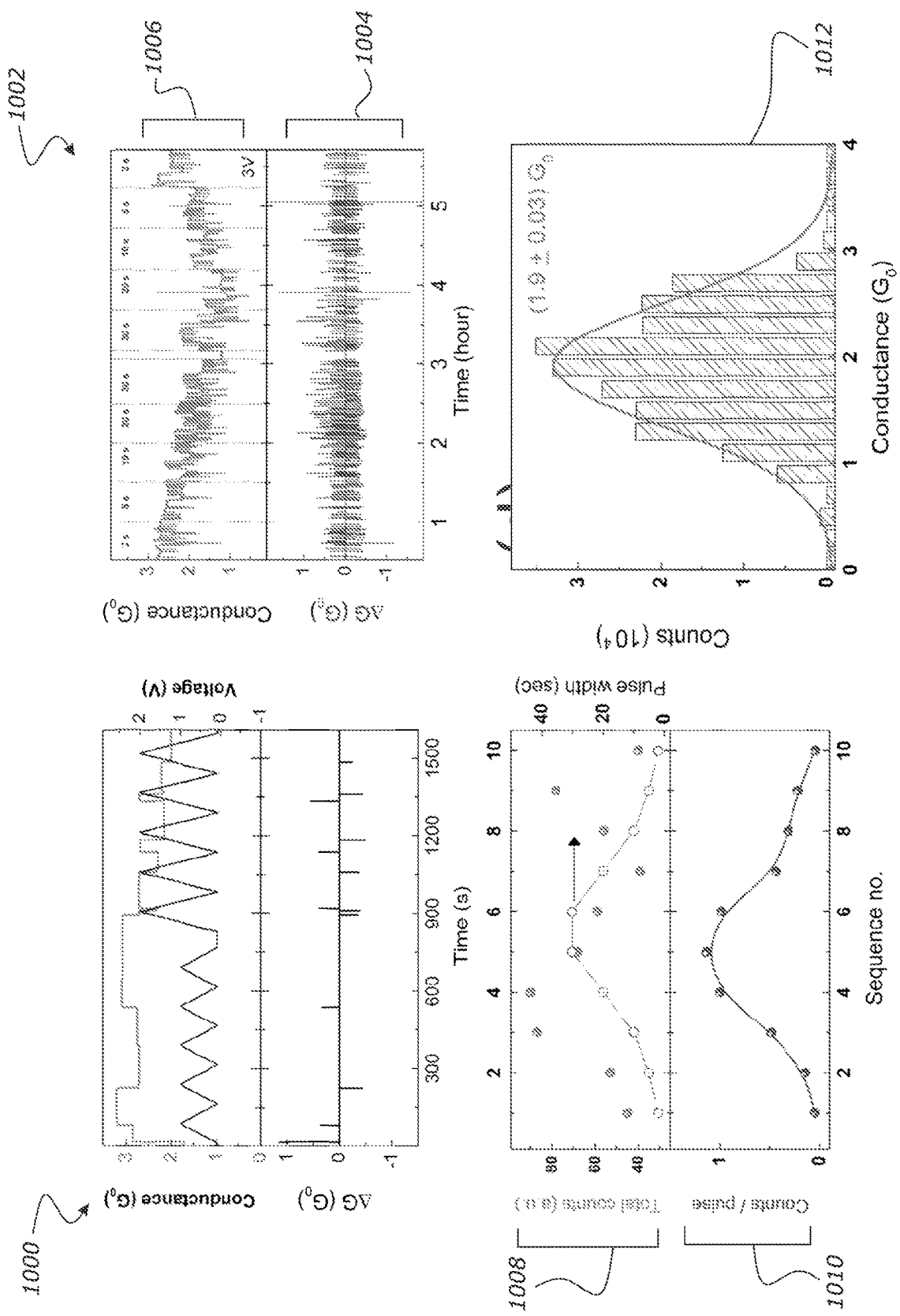
FIG. 10 shows switching data for a sample prepared with ambient air.

FIG. 10 shows switching data for a sample prepared with $P_{dep}=10\times10^{-6}$ Torr and RH~80% of ambient air. Shown at 1000 is switching in response to voltage sweeps with increasing amplitude. Voltage sweeps do not provide clear information about the change in switching probability with voltage or time.

Shown at 1002 is switching in response to a sequence of square voltage pulses with fixed amplitude and variable widths (from 2-30 s). The conductance 1006 changes in response to switching events that occur due to application of voltage pulses but remains unaltered for read voltages of 0.1 V as seen in the flat section in middle of the sequence. Shown at 1004 are switching events with $|\Delta G| \geqslant 0.1$ $G_0$. This threshold filters out noise in the data.

Shown at 1008 is the total number of switching events in each pulse sequence which does not depend significantly on the pulse width. However, as indicated at 1010, there is an increase in the number of switching events per pulse at longer pulse widths.

Shown at 1012 is a histogram of the measured conductance during the measurement sequence. The histogram shows a clear peak around 2 $G_0$. The bars represent experimental data and the solid curve a Gaussian fit.

FIG. 10 shows that the switching behaviour of interest can be observed in response to both sawtooth and pulsed voltage inputs. Sawtooth inputs have the disadvantage that (because the voltage is continuously changing) it is not possible to clearly identify either the voltage or time dependence of the switching behaviour. In contrast, by using square pulses it is straightforward to probe both the pulse width and voltage dependence of the switching behaviour.

Shown at 1008 is that the total number of switching events is roughly constant and does not vary monotonically with pulse width. When normalized by the total number of pulses it becomes clear that the number of events/pulse is significantly higher for longer pulses and that for pulse widths of 30 sec there is approximately one event per pulse.

Although the shorter pulses enhance the probability of G↑ events, G↓ events are required to reset the switches before next G↑ event can occur. Furthermore, the average conductance during the measurements is strongly peaked around 2 $G_0$, as shown in at 1012. The solid curve is the Gaussian fit to the experimental data points. This indicates that the conductance through the device is being dominated by the presence of atomic scale wires with ~2 effective conductance channels and is consistent with the results for networks that were not deliberately oxidised published previously.

Figure 11:
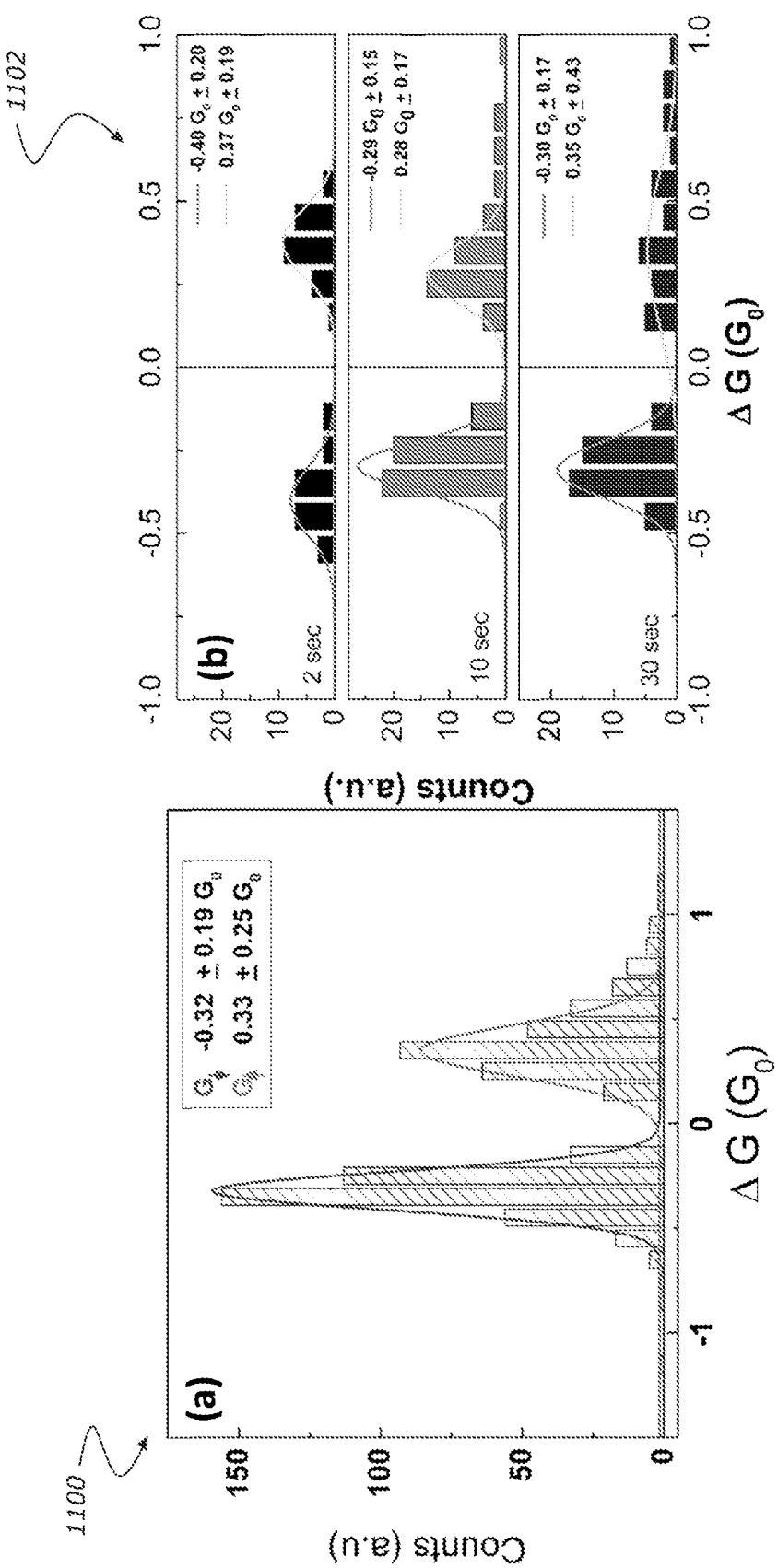
FIG. 11 shows histograms of switching events.

FIG. 11 shows at 1100 that the histogram of sizes of switching events in FIG. 10 indicates clear preference for $|\Delta G|=\pm 0.3$ $G_0$, for both G↑ and G↓ events. The solid lines are Gaussian fits to the frequency distribution.

Histograms of ΔG are strongly peaked for the oxidized deposited nanoparticles; in this case both increases and decreases in conductance show peaks close to 0.3 $G_0$. As disclosed below, these results can be explained by the existence of a resistance in series with the atomic scale wire due to the granular percolating film that surrounds critical sites at which the atomic scale wires are being created and destroyed. Histograms are shown at 1102 of switching events for different pulse widths, showing majority of G↑ and G↓ events being centred around ±0.3 $G_0$ for shorter pulse widths.

As shown at 1102 it is apparent that switching events which decrease the conductance exhibit peaks in the histogram at 0.3 $G_0$ whereas switching events which cause an increase in conductance are peaked at 0.3 $G_0$ only for small pulse widths. For longer pulse widths there are a significant number of larger conductance changes and the histogram is not strongly peaked.

This behaviour can be understood as being the result of the breaking of atomic scale wires due to electromigration during the long pulses. When the current is applied for a long time more wires are broken which means that when the next pulse is applied there are more sites available for formation of new wires. Hence at higher pulse widths of 20-30 s the efficient breaking of connections leads to an increase in the number of large G↑ events.

In an embodiment the atomic scale wires are comprised of Sn wires, formed by electric field driven processes and broken by electromigration. The atomic scale wires bridge the gap between two metal Sn nanoparticles. The atomic scale wires may be freestanding or partially supported by a surrounding oxide layer or wholly supported in a matrix of oxide that is present between the particles.

Figure 12:
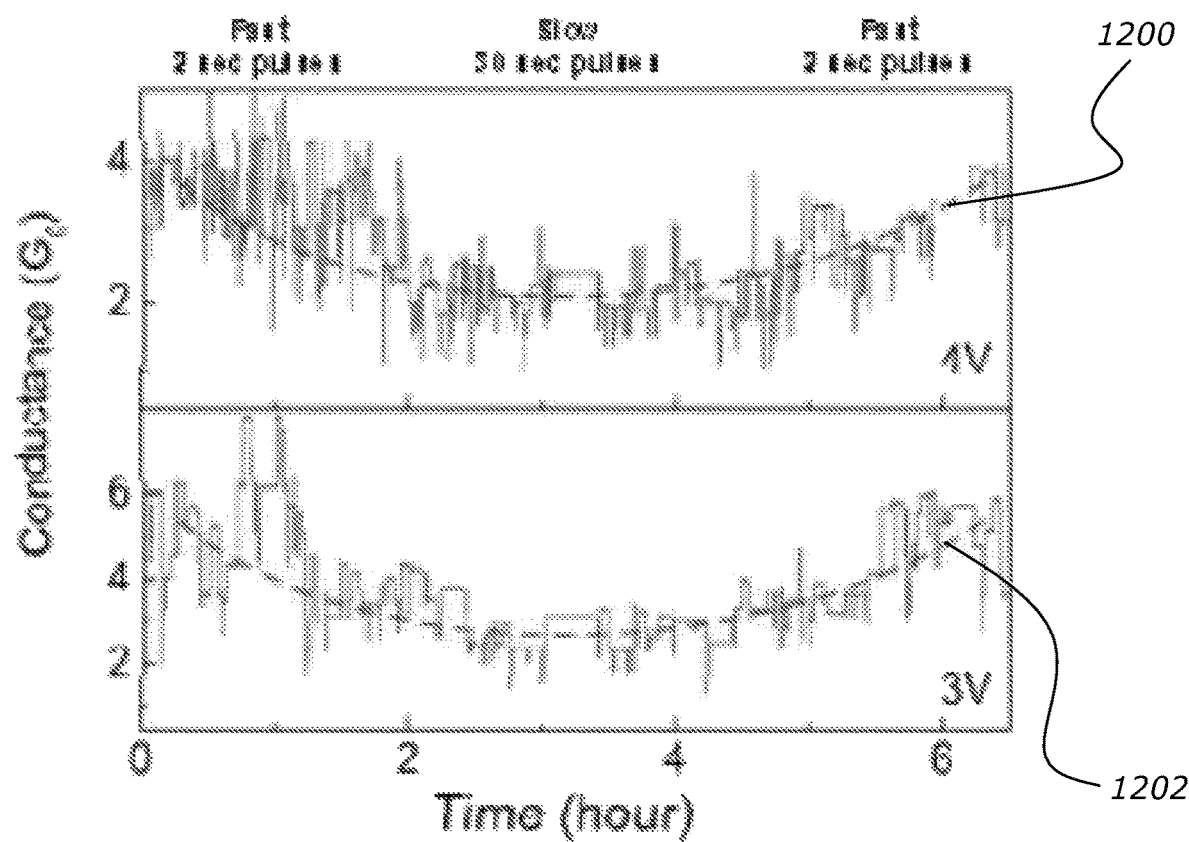
FIG. 12 shows stimulus pulse width dependent changes in conductance.

FIG. 12 shows stimulus frequency dependent changes in conductance. It appears that on average the faster pulses (for example 2 s) induce more connections in the network in comparison to longer pulses, resulting in higher average conductance values. Dashed lines 1200 and 1202 are guides to the eye. This data is from a sample prepared with with $P_{dep}=10\times10^{-6}$ Torr and RH~55% of synthetic air.

FIG. 12 shows that short pulses (2 s width) induce more connections in the network in comparison to longer pulses, resulting in higher mean conductance values. FIG. 12 shows the experimental data for 3 and 4V pulse height. This data shows that the potentiation in the nanoparticle network is stimulus frequency dependent. Such stimulus frequency dependent potentiation is a well established signature of a neuromorphic system.

Figure 13:
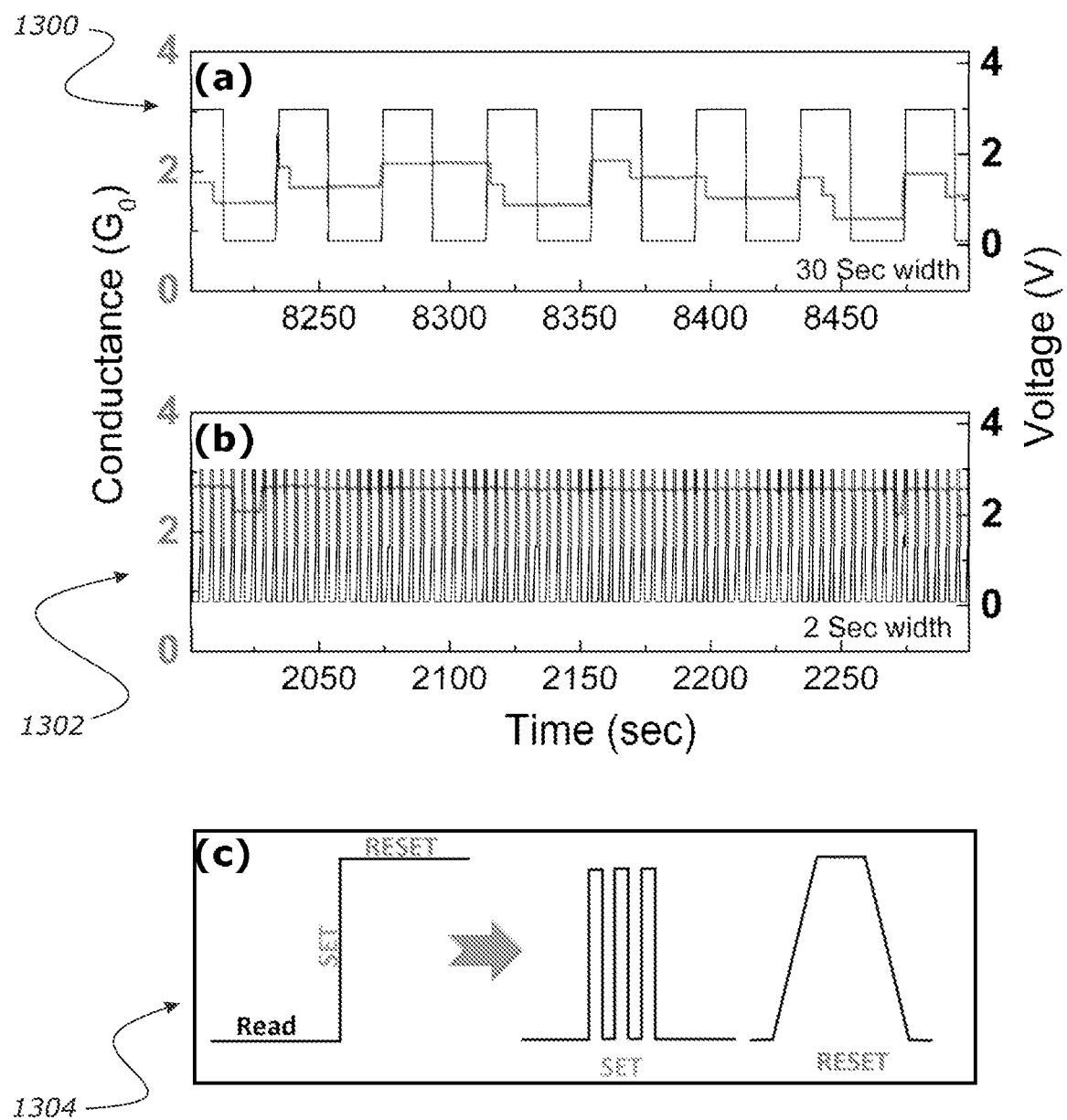
FIG. 13 shows examples of switching behaviour for pulses with various widths.

The stability of metallic Ag wires formed in prior Ag—$Ag_2$S systems is enhanced when voltage pulses are applied in rapid succession, similar to LTP in the mammalian brain FIG. 13 presents examples of the switching behaviour for pulses with 30 s widths 1300 and 2 s widths 1302. The G↑ events appear to occur almost exclusively at the leading edges of the pulses, showing that the electric field induced formation of atomic scale wires occurs on a timescale that is effectively instantaneous compared with the pulse length, whereas the G↓ events occur after several seconds of current flow, consistent with the idea that electromigration breaks the atomic scale wires.

Short pulses where the current does not flow for long enough to break the atomic scale wires are indicated at 1302. There are very few G↓ events. Therefore the conductance remains high indicating that atomic scale wires have formed in most (or all) of the available tunnel gaps, and so it is not possible to form additional wires (there are no further G↑ events) unless an G↓ event occurs first.

Shown at 1304 is a scheme for reading, setting and resetting the state of the network or for tuning the network conductance with pulse-edge induced SET i.e. G↑ and high-current induced RESET (G↓) coupled with low-voltage READ. Once a desired network conductance is established via SET/RESET, the system conductance is very stable over the period of measurement (at least weeks).

Figure 14:
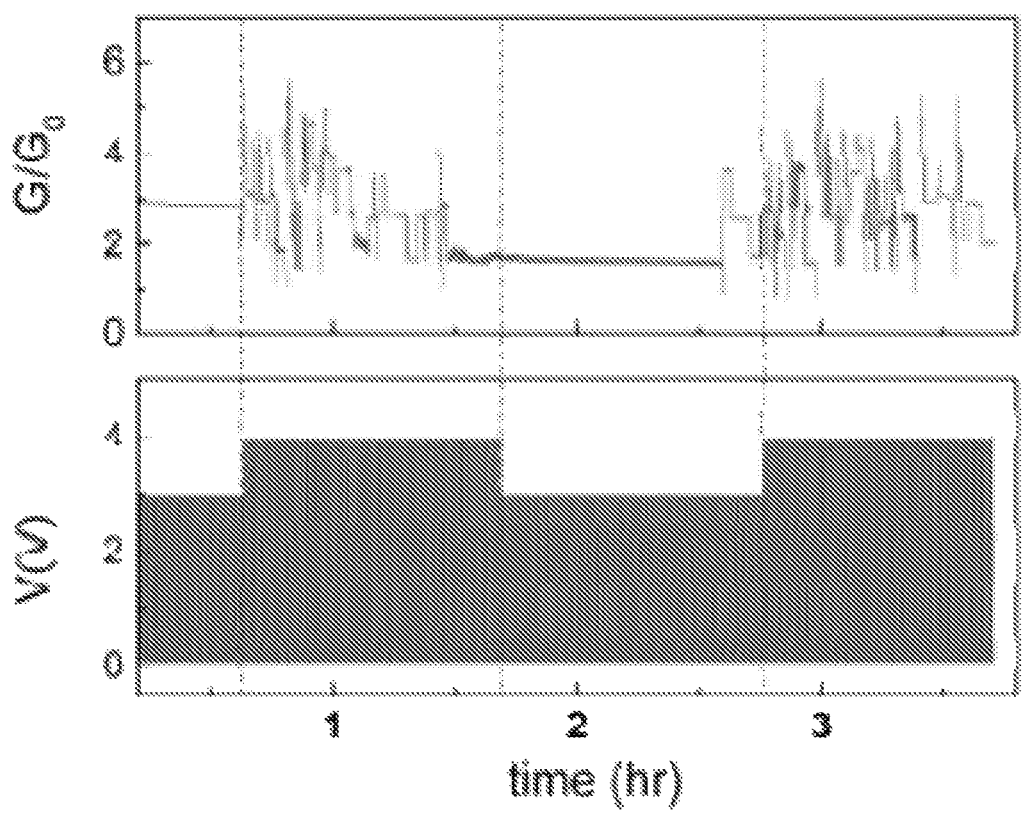
FIG. 14 shows stimulus voltage dependent conductance data of the sample shown in FIG. 6.

FIG. 14 shows conductance data of the sample described in FIG. 6 showing that ultra-stable conductance switching in these nanoparticle-assemblies requires application of a minimum voltage-stimulus. The 3V pulses generate very few switching events, whereas 4V pulses trigger a multitude of switching events. This can be seen in the light of threshold action potential requirement at the axonal ion-channels in biological brains for information propagation.

Shown in FIG. 14 is a segment of data acquired during the long sequence of measurements on the sample used to obtain the data in FIG. 6 (Ambient air, $P_{dep}=10\times10^{-6}$ Torr, RH~80%) showing that a critical voltage (or, equivalently, electric field) is required to activate the switching process. In this example voltage pulses with amplitude 3V cause almost no switching events, whereas 4V pulses cause a great many switching events. The existence of a critical electric field is consistent with the model of electric field induced formation of atomic scale wires.

Figure 15:
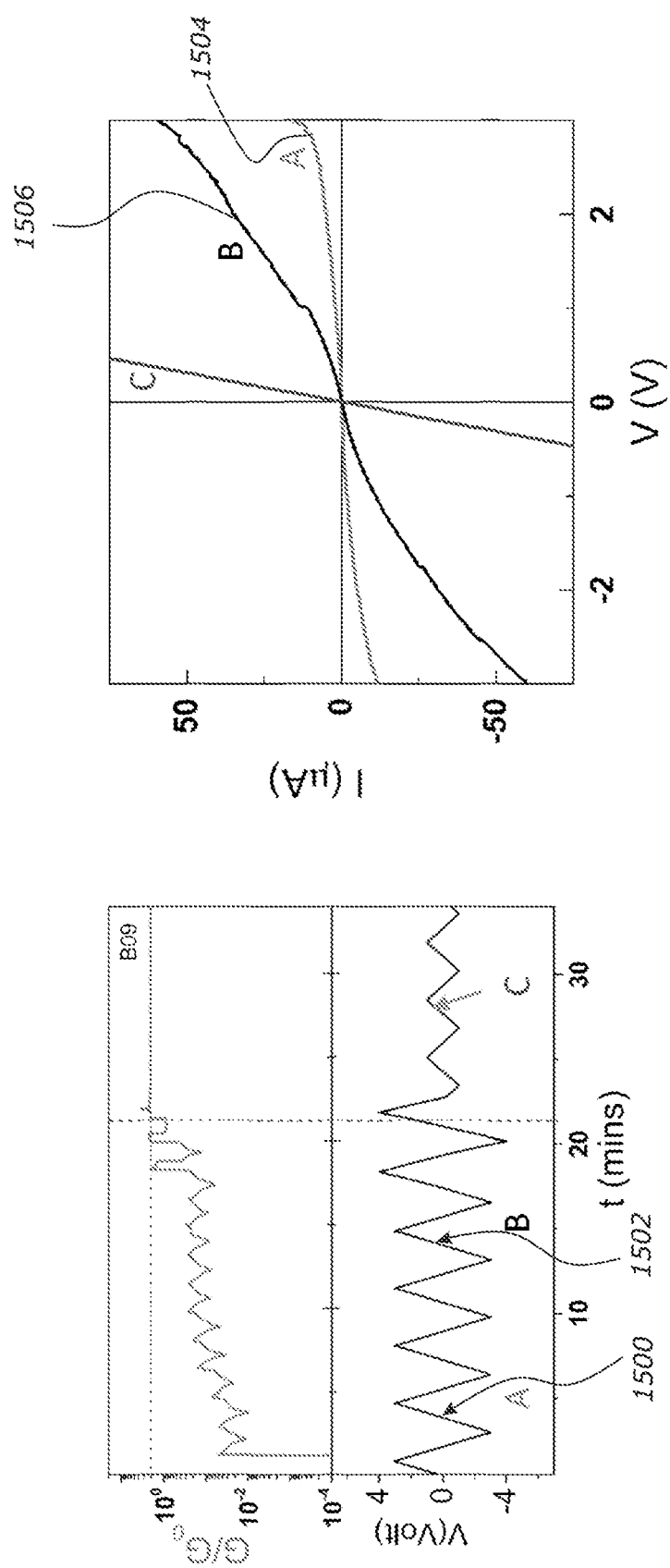
FIG. 15 shows bipolar voltage sweeps applied to the sample shown in FIG. 6.

FIG. 15 shows slow bipolar voltage sweeps applied to the sample described in FIG. 6, showing tunneling behaviour. This behaviour is evident from non-linear current-voltage (IV) characteristics e.g. at points 1500, 1502, 1504, and 1506. The successive voltage-sweeps increase G by two orders of magnitude before the tunnel-gap jumps-to-contact and G→2 $G_0$. This newly formed connection is then stable under further voltage sweeps and shows the expected linear IV characteristics.

The series of measurements shown in FIG. 15 are of a similar sample to that described in FIG. 10, when subjected to a series of voltage ramps. The sample is initially open circuit (G=0) but exhibits a sudden jump to a conductance of G~0.01 $G_0$, which corresponds to the formation of a tunnel gap which is sufficiently small to allow a measurable current to flow.

Subsequent ramps cause a steady increase in conductance, corresponding to a narrowing of the tunnel gap under the influence of the electric field, until after about 20 minutes an atomic scale wire closes the tunnel gap, leading to a conductance G~2 $G_0$. The wire breaks and re-forms a couple of times and then is observed to be completely stable when subject to ramps to low maximum voltages. These results are again consistent with the model of electric field induced formation of atomic scale wires, and are similar to data previously published for formation of atomic scale Ag wires which was interpreted as representing Sensory Memory, Short Term Memory and Long Term Memory which are key characteristics of biological synapses. Such formation and annihilation of metallic atomic scale wire with orders of magnitude change in conductance has also been proposed as a candidate for a novel resistance random access memory (ReRAM).

In an embodiment, Sensory Memory, Short Term Memory and Long Term Memory of individual synapses are important in providing characteristics that allow processes similar to Spike Timing Dependent Plasticity (STDP) which occurs in biological neural systems. The controlled closing of tunnel gaps shown in FIG. 15 indicates a sensitisation of one or more individual synaptic (memristive) elements so that electric field driven formation of an atomic scale wire is more likely, especially when a plurality of voltage inputs (pulses) are applied in rapid succession, providing a process that is comparable to STDP.

This sensitisation corresponds to an activation of the individual synaptic (memristive) elements so that they are more likely to switch in response to an applied voltage pulse i.e. the switching rate or likelihood of switching is increased. Sensitisation of multiple synaptic elements then leads to sensitisation of a pathway across the system and provides an opportunity for potentiation and other neuromorphic behaviour such as recurrency in response to applied voltage pulses.

As is evident from FIG. 1 each atomic scale wire that is formed in a tunnel gap takes its place in a complex network. This complexity is exactly what is required for applications such as reservoir computing and hardware implementation of artificial neural networks. There is a potential that the existence of this complex network will lead to measurement of a resistance for the device that is different to the resistance of an individual atomic scale wire.

If the resistance of the groups of nanoparticles forming the complex network is small, quantised resistance can be observed for the network as a whole. In the present stabilized samples, non-integer conductance values are observed as well as non-integer values of ΔG. This is explained as being the result of the presence of either (or both) series or parallel resistors in the complex network.

The measurement of quantised resistance values requires both a negligible series resistance in the network and a specific morphology that yields the required low series resistance i.e. the size of the individual nanoparticles formed by coalescence and the connectivity between them controls the series resistance and therefore the measured resistance value.

Since devices are targeted that exhibit large switching events (large ΔG) and the observation of quantised resistance (G=n$G_0$), it is desirable that the morphology of the network provide the required low series resistance.

By tuning the morphology of the network there is a potential to tune the network conductance and the size of the conductance steps that occurs when a switching event occurs. This control of the size of the switching events has the potential to be useful in some applications, as it is likely to be linked, for example, to the level of recurrency in the reservoir for reservoir computing applications.

The percolating devices comprise a network of nanoparticles that can be considered as a complex network of conducting paths and represented in a circuit as a network of conductors. When an atomic scale wire is formed somewhere within the network the wire has a quantised conductance N$G_0$ and the rest of the network can be considered to be an equivalent circuit comprising a series conductance α$G_0$ and a parallel conductance β$G_0$. All conductances are expressed in units of $G_0=2$ $e^2/h$; α and β could be any real numbers, whereas N is an integer.

In principle any network of particles around the quantised conductor can be reduced to a circuit with this combination of conductors. A demonstration is provided of the effect of this conductance on the measured conductance of the network, G. The histograms presented in FIGS. 10 to 11 show strong peaks in G at 2 $G_0$ and histograms of changes in conductance have a strong peak at 0.3 $G_0$.

The total conductance of the network is $$G=\alpha(N+\beta)/(\alpha+\beta+N) \quad (1)$$

The quantised conductance is allowed to change by a quantised amount, $\Delta N$, so that $N'=N+\Delta N$ and the new conductance is $$G'=\alpha(N'+\beta)/(\alpha+\beta+N') \quad (2)$$

so that the change in conductance is $$\Delta G=G'-G=\alpha 2\Delta N/[(\alpha+\beta+N)(\alpha+\beta+N+\Delta N)] \quad (3)$$

The vectors ($\alpha$, $\beta$, N, $\Delta N$) represent all the possible parameters that need to be considered.

Since, experimentally, $\Delta G \sim 1/3$ and $G \sim 2$, the experiments put strong constraints on the values of ($\alpha$, $\beta$, N, $\Delta N$) that can lead to relevant solutions of the above equations. We find numerically that when N and $\Delta N$ are restricted to physically reasonable integer values less than 10, the values of $\alpha$ and $\beta$ that meet these constraints are limited to the range $2<\alpha<5.5$ and $\beta<10$.

These solutions indicate that in order to achieve the experimentally observed quantized conduction and well-defined changes in conductance after the switching events, the parallel conductance cannot be too high, and the series conductance is restricted to a relatively narrow range. The range of series conductances corresponds to a range of series resistances of ~2-6 k$\Omega$, while the parallel resistance must be bigger than ~1 k$\Omega$. The measured resistances of the percolating networks that exhibit interesting switching effects are consistent with these ranges but it is anticipated that in other networks, for example those comprising nanoparticles of other materials or other morphologies, the ranges of necessary conductances may be different.

Since $\alpha$ and $\beta$ represent the electrical properties of the rest of the percolating network, it follows that the morphology of the actual device must be such that it provides series and parallel resistances in these ranges. The sizes of the nanoparticles and morphology of the network are controlled by coalescence, and in light of this analysis it is clear that one of the functions of the deliberate oxidation process introduced during deposition of the nanoparticles is to constrain the morphology of the network so as to allow quantised conduction and interesting switching behaviour to be observed.

Figure 16:
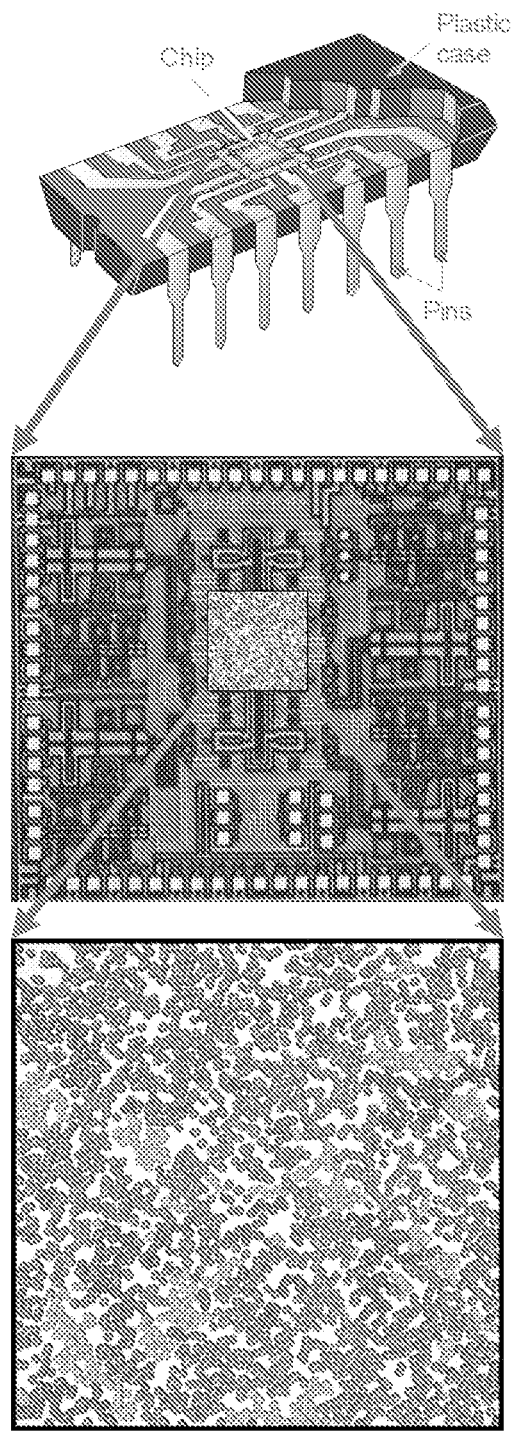
FIG. 16 shows an example of percolating networks applied to real-world applications.

FIG. 16 shows an example of the percolating networks disclosed above applied to real-world applications such as pattern recognition, reservoir computing or echo state systems. In an embodiment, at least one percolating networks is incorporated into a standard CMOS integrated circuit.

In an embodiment, the 100 μm wide neuromorphic network containing the ~20 nm nanoparticle components is connected to conventional CMOS circuitry which provides input-output (I/O) signals to/from the neuromorphic device. FIG. 16 shows connected groups of nanoparticles in the percolating network.

As disclosed above, the percolating network provides functionality through its complex network of memristive switching elements. In an embodiment the CMOS componentry is required to process the input and output signals in order to provide inputs to the network that have the required voltage levels and the required temporal nature. Examples include DC levels, sine waves, and/or voltage pulses depending on the application.

For applications such as reservoir computing, it is anticipated that the output circuitry will include adjustable output weights which allow combination of the output signals in order to achieve, for example, certain classification tasks.

Figure 17:
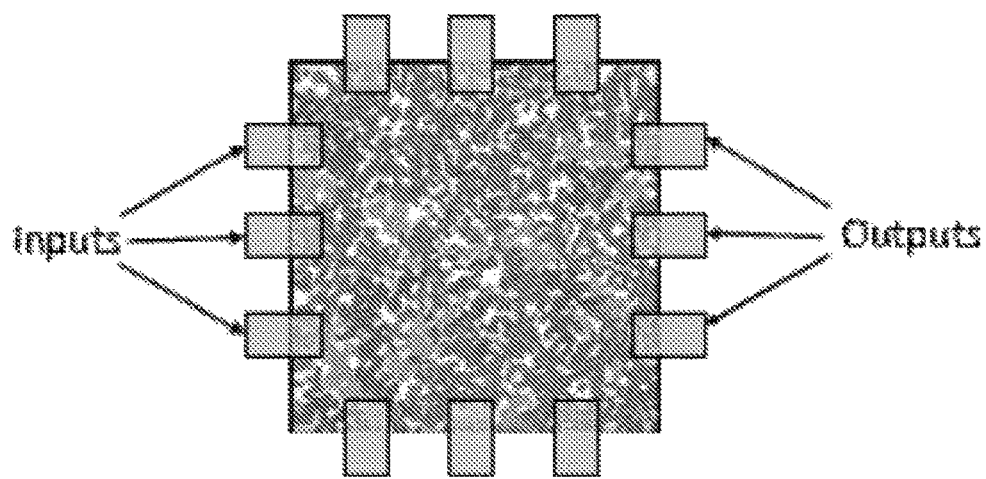
FIG. 17 shows a schematic of a percolating network.

FIG. 17 shows a schematic of a percolating network comprising many groups of particles separated by tunnelling gaps surrounded by an array of contacts/electrodes. In an embodiment the contacts/electrodes are designated as input or output terminals depending on the computation task at hand.

In an embodiment, inputs to the devices are voltage pulses, and the outputs are current pulses. It will be appreciated that the type of signal will be different for different applications. The electrodes provide a connection between the percolating network and the input/output circuitry.

Figure 18:
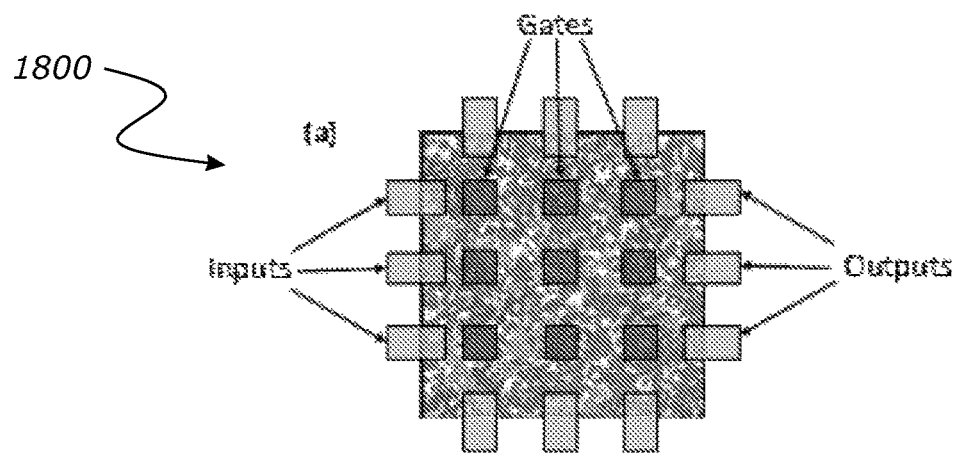
FIG. 18 shows a schematic of an array of gate electrodes.
Figure 18:
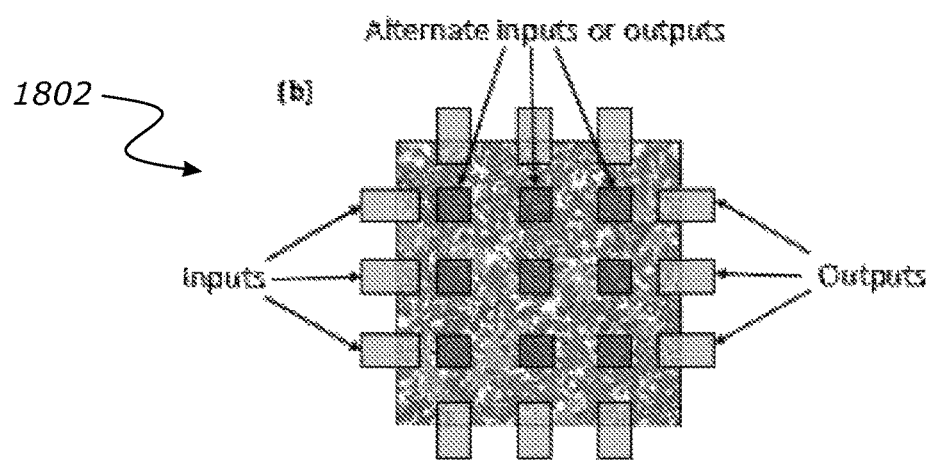

FIG. 18 shows at 1800 an embodiment of an array of gate electrodes under the nanoparticle system that is fabricated to be capacitively coupled to the network. In an embodiment the array of gate electrodes are positioned on top of the nanoparticle system.

In an embodiment the array is used to modulate the electronic conduction of the percolating network. This is equivalent to modifying the synaptic weights in the interior of an artificial neural network.

Shown at 1802 is an embodiment in which the additional electrodes are utilized as input to the network when coupled ohmically. In an embodiment the additional electrodes are coupled capacitatively. One application is to feedback an echo of the network status in certain computation processes.

In an embodiment the signals to these alternative input electrodes are functions (generated by CMOS circuitry) of the output signals. In an embodiment these inputs are used to provide feedback or recurrency which is required in certain computing/data processing/pattern recognition tasks.

In an embodiment the additional contacts illustrated at the top and bottom of the network in FIG. 18 are used for similar purposes.

One application for the networks illustrated in FIG. 18, that include arrays of gates or input terminals, is in the fields of pattern/image processing applications wherein, for example, the array of gates or inputs may be coupled to an array of photodetectors (such as a CCD chip).

In an embodiment the output of a device such as a CCD chip is encoded into a time series which is input to one of the terminals of the device. As indicated above the CMOS circuitry of the surrounding chip in some embodiments is used to combine output signals in any appropriate way, as required for the particular task of interest. In an embodiment the signals are combined in proportion to linear weights which are determined by a training procedure.

The number of electrodes illustrated in FIGS. 16 to 18 can be varied as desired within the limitations of the lithography system used to define the chip onto which the percolating network is deposited.

In an embodiment the electrodes are arranged in a well-defined array as shown in FIGS. 16 to 18. In an embodiment the electrodes are arranged in a deliberately disordered or other pattern.

In an embodiment the size of the electrodes is comparable to the size of typical groups of particles, but other configurations are anticipated, for example larger electrodes may be required to average over the output signals from many nodes in the network.

Disclosed above is a unique approach for fabrication and stabilization of tin—tin-oxide nanoparticles for multi-level conductance switching. Utilizing humidity in ambient air and humidifier in synthetic air we have shown that ultra-stable conductance switching in these percolating nanoparticle system can be achieved. The stimulus of voltage sweep & pulse controls the formation and annihilation of atomic scale wires and thereby modifying the sample conductance. Application of faster pulses (2 s width) biases the system towards higher conductance with conductance steps about 0.3 $G_0$.

Also discussed is a scheme to incorporate these sample into real-world chip architecture for practical applications in the realm of neuromorphic and Reservoir computing, or in hardware implementations of variants of ANNs.

Described above is the use of percolating films of nanoparticles that provide complex networks of switches that can be stabilized to allow reproducible switching behaviour over many months. The individual switching events are caused by the formation (or breaking) of atomic scale wires within one of many tunnel gaps in the percolating film, leading to increase (decrease) in the sample conductance (G). These are labelled as $G\uparrow$ ($G\downarrow$) events. These networks have been shown by computer simulations to have the complexity required to allow potentiation in a way that is similar to the learning behaviour of networks of synapses in the human brain.

Given that these devices are continuously exhibiting many switching events which change the overall device conductance, it is emphasised that 'stability' means that the device remains within a useful conductance range, and not that the device has a fixed conductance. Obviously this kind of reproducibility and stability is essential for real-world applications such as reservoir and neuromorphic computing.

Disclosed above is the results for networks in which it is assumed that the applied electric field causes the formation of the atomic scale wire, and that the large currents which then flow cause the breaking of the wire at a later time due to electromigration.

This behaviour can be regarded as being memristive, and indeed it is also possible to incorporate truly memristive devices into the percolating network. For example it is possible to incorporate any of Ag/AgS electrochemical switches, switching molecules, or standard oxide memristor devices into these percolating structures.

The percolating network has the potential to provide a complex network of connections and switches that are comparable to the neurons and synapses in the human brain.

The percolating networks are suitable for applications of many types, but especially for implementation in hardware of various types of Artificial Neural Network. For example, by providing an output layer using standard CMOS technology the networks will allow implementation of a RC system such as an Echo State Network.

Sample stability against coalescence-induced and electromigration-induced disconnection of the conducting paths can be achieved by oxidation of the Sn nanoparticles during deposition.

Moisture in the air used in the oxidation process plays a vital role in stabilising the devices. The required relative humidity (RH) is >60%.

An external series resistance can limit current flow through the device and therefore prevent electromigration; this provides a method for prolonging the lifetime of devices that have been inadequately stabilized by oxidation.

In these examples it is found that increases in conductance (switching events that cause formation of a new atomic scale wire) typically occur at the leading edge of an applied voltage pulse, while decreases in conductance (switching events resulting from electromigration driven breaking of an existing atomic scale wire) occur after several seconds of high current flow. It is expected that optimised devices and measurement procedures will exhibit much faster switching, possibly up to GHz frequencies.

$G\uparrow$ events are only observed at the leading edge of the applied voltage pulse and not during the pulse when the voltage is constant. This indicates that not only the magnitude but also the time-gradient of the electric-field is responsible for the formation of connections in the network.

The number of $G\uparrow$ events per pulse is independent of the length of the input voltage pulse, consistent with switching ON occuring only at the leading edge of the input voltage pulse.

Prior to formation of an atomic scale wire the gradual closing of tunnel gaps in the percolating film is observed as a progressive decrease in tunneling conductance. The field-emission-induced closing of tunnel gap and the subsequent formation of atomic wire has been observed and also been proposed as resistance random access memory (ReRAM).

A threshold voltage is typically required to initiate switching. This is linked to the critical field required for Electric Field Induced Evaporation (EFIE) and Electric Field Induced Surface Diffusion (EFISD) connection processes which drive the formation of atomic scale wires.

When the applied voltage is low (0.1 V), which is designated as the READ voltage, there are neither $G\uparrow$ nor $G\downarrow$ events.

The magnitude of both $G\uparrow$ (ON) and $G\downarrow$ (OFF) events are centered around ±0.3 $G_0$, which we associate with a requirement for a certain well-defined grain size/morphology in the nanoparticle film.

The resistances (associated with the remainder of the film) in series and parallel with the key tunnel gap in the percolating network are found to be critical in determining the observed sizes of the switching events.

Since the morphology controls the series resistance, quantised switching is only observed when the morphology provides a series resistance in the required range.

In addition to the $G\uparrow$ and $G\downarrow$ events described above, under favourable conditions, the network also shows synchronous switching G levels, i.e. the switching is fully synchronous with the applied pulses.

While the experiments discussed above are limited to 2 s pulse widths, it is anticipated that straightforward modification of the electronics allows the pulses to be generated at least $10^6$ times faster, ultimately at GHz frequencies. The time scales for atomic scale wire formation could be as short as nanoseconds or even picoseconds.

Disclosed above is the use of oxidation. It is anticipated that sulphidisation plays a similar role to oxidisation and that sulphidisation, especially of Ag nanoparticles. Therefore suphidisation is considered as an alternative embodiment of the invention.

The neuromorphic properties of the percolating system is demonstrated through computational modelling of electrical transport across the devices. In one embodiment the formation of atomic scale wires in at least one tunnel gap can lead to an avalanche of subsequent wire formation in other tunnel gaps, and consequent increases in conductance that mimic the increase in connectivity of biological neural systems in response to inputs.

In other embodiments, the percolating network includes other memristive elements. Equivalently, activation of a single memristive element (i.e. the memristive element becomes more likely to switch on or off) leads to activation of a series of memristive elements in at least one pathway across the network. In a specific preferred embodiment the memristive elements are molecular switches.

A distinction is made between STP and LTP of individual synapses and potentiation of a pathway through a network (e.g. of neurons and synapses). The term 'potentiation' refers to the latter i.e. the sensitisation of a pathway. The potentiation of the network results from an avalanche of synaptic connections.

Described below are examples of simulation details. One embodiment involves simulations of overlapping disks for a system size of 200×200 particle diameters. This size is selected in an attempt to provide the best trade-off between computational time and finite size effects. The disks are allowed to have random positions.

Figure 19:
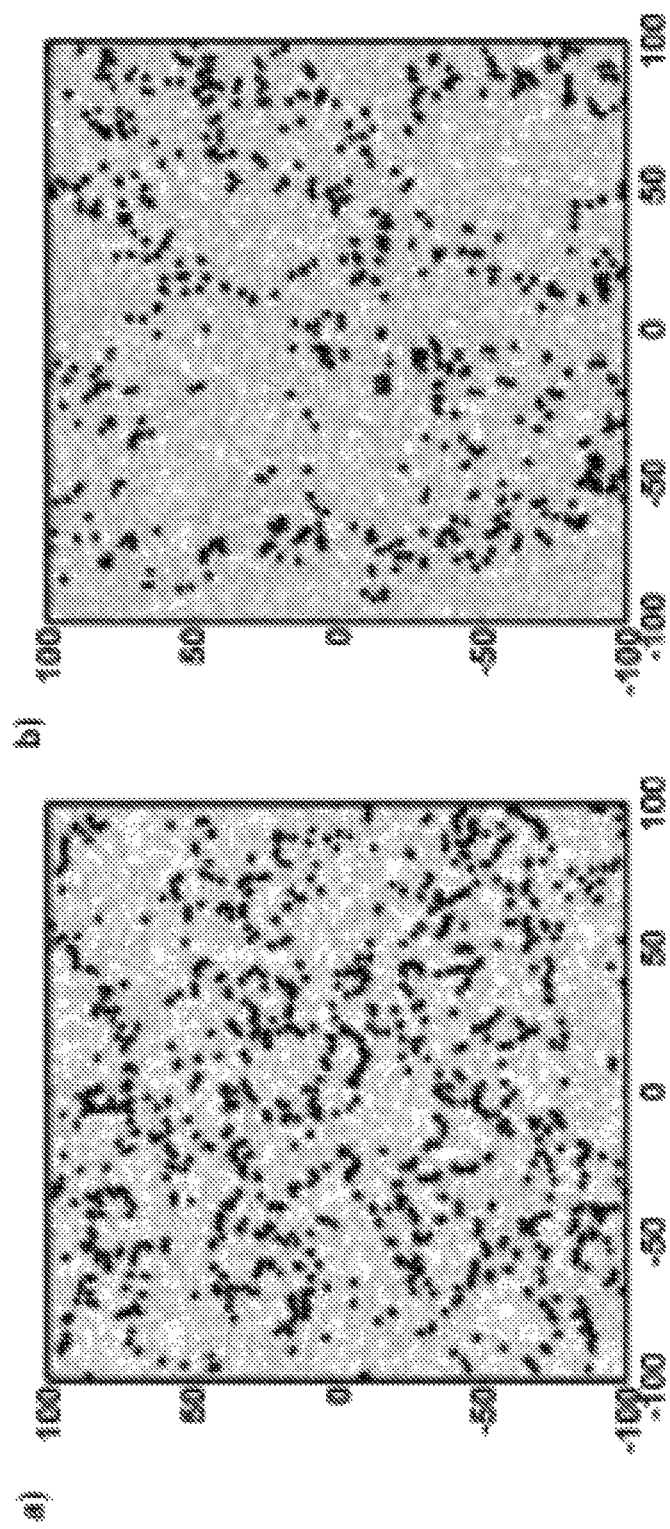
FIG. 19 shows positions of memristive switching events in an embodiment in which a surface coverage is close to yet below a percolation threshold.

FIG. 19 shows schematically the regime where the surface coverage p is close to but just below the percolation threshold $p_c$, i.e. below the percolation threshold. The connections between overlapping particles are assumed to have negligible resistance. Each gap is assigned a conductance $$G_i = A \exp(-\beta L_i) \quad (4)$$

where A and β are constants and $L_i$ is the size of the gap (A is chosen to be 1 for convenience and β=100 as this provides a reasonable model of the experimental situation.

In an embodiment the conductance of the network is calculated by solving for the voltages at each node, with boundary conditions set by the voltage difference between the electrodes on either side of the system. The particles are assumed to be monodisperse with diameter 1 although it is well established that allowing the particle size to vary has no substantive effect on the percolating properties of the system. All distances (e.g. $L_i$, β) are measured in units of the particle diameter.

In an embodiment the switching process is simulated by identifying the smallest gaps between each pair of groups. Those gaps with electric fields larger than a chosen threshold are identified (here $E_{th}$=0.9) [Units are volts per nanoparticle diameter.] which are then replaced with a large conductor ($G_{Ohmic}$=10Ω$^{-1}$ which may represent the formation of an atomic scale wire with quantised conductance) with probability P↑.

This process simulates the formation in the tunnel gap of an atomic wire, which occurs due to either electric field induced surface diffusion (EFISD) or electric field induced evaporation (EFIE), but could also represent a memristive element which turns 'on'. The probability P↑ accounts for the stochastic nature of the switching process.

For most if not all the simulations the cumulative number of replacements is recorded (i.e. switching events), $N_R$, as well as G and the current flowing, I. In one embodiment the focus is on voltage ramps for consistency with the experimental protocol. It will be appreciated the effect of DC applied voltages and voltage pulses could also be recorded.

In an embodiment simulation the conductance can only increase. Such simulations are a deliberate simplification of the experimental situation where decreases in conductance are also observed due to breaking of the atomic scale wires by electromigration when I exceeds a current threshold $I_{th}$=0.1. Embodiment simulations which incorporate decreases of conductance resulting from electromigration are also disclosed below.

It will be appreciated that if both creation and breaking of connections is possible there will be random switching of the conductance around some mean value that is determined by the relative probabilities of the two types of events. A simplified model more clearly demonstrates potentiation of the network i.e. neuromorphic behaviour of the system.

FIG. 19 shows a map of 200×200 system of overlapping discs (grey) with locations of switching events shown using black dots. The electrodes (not shown) are at the left and right edges of the system. $V_{max}$=1V and p=0.55 (left), p=0.65 (right).

At higher coverages the larger size of the connected groups of particles means that there are fewer tunnel/switching junctions (or more generally memristive elements) between groups and a much higher conductance prior to the switching process (by up to 8 orders of magnitude); it also means that there are fewer locations at which switching can occur.

FIG. 20 shows the current through the percolating system of nanoparticles in response to the applied sawtooth voltage with $V_{max}$=1V and P↑=10%. For low coverages (p=0.55, shown at 2000) the initial conductance is low (invisible on this linear scale during the first cycle of the voltage ramp) because all current flow is via small tunneling conductors.

It is immediately clear however that the current increases in response to the increasing applied voltage during the second voltage cycle, as is expected when the tunneling conductors are replaced by high conductances representing atomic scale wires. Subsequent cycles of the voltage ramp cause a further increase in the current until after the fifth cycle the network conductance is dominated by the high conductances $G_{Ohmic}$ and saturates.

At higher coverages (p=0.65, shown at 2002) significant current is observed immediately and the conductance saturates much more quickly. This is because the tunneling gaps are both fewer and smaller and so the applied voltage causes a more dramatic increase in electric field, resulting in more switching events even at low voltages during the first cycle of the voltage ramp.

Figure 21:
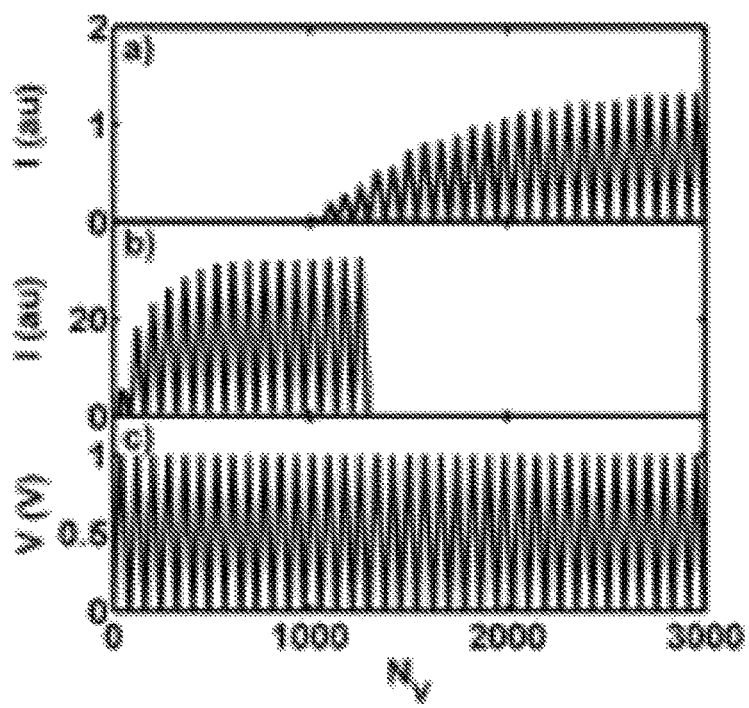
FIG. 21 shows current through a percolating system of nanoparticles having a smaller switching probability than the system of FIG. 20.

FIG. 21 shows similar results for P↑=1% where, because the switching probability is smaller, a larger number of voltage cycles are required but eventually the conductance again saturates.

While FIGS. 20 and 21 clearly show the increase in current with time it is evident that for much of the time the current flow tracks the sawtooth voltage waveform: the neuromorphic behaviour is shown more clearly in logarithmic plots of the system conductance G versus $N_V$, as in all further plots below.

Figure 22:
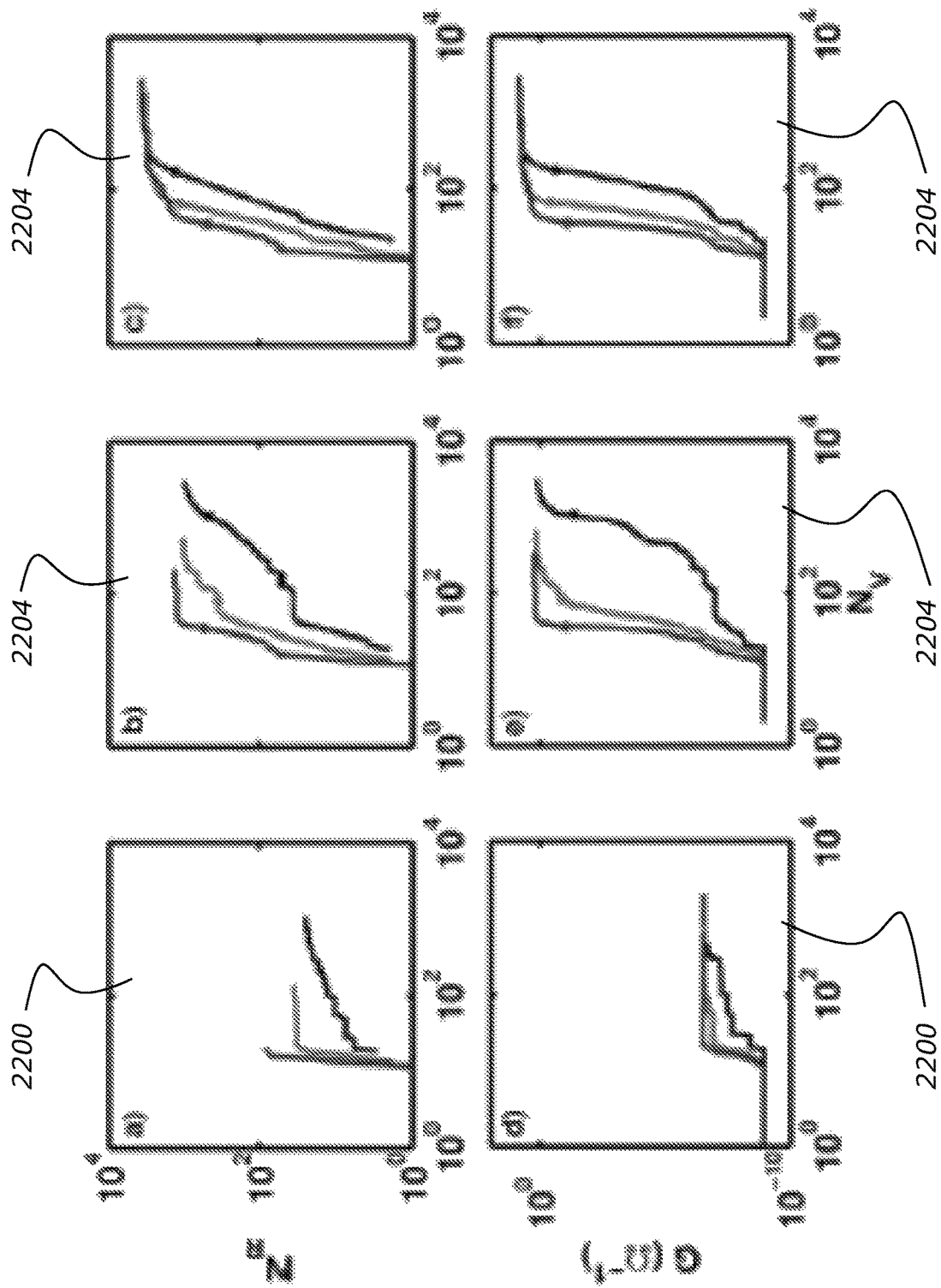
FIG. 22 shows the number of switching events and system conductance as a function of time.

FIG. 22 shows the number of tunnel junctions replaced ($N_R$) and system conductance (G) as a function of time (number of voltage steps, $N_V$) for p=0.55 and P↑=1, 10, and 80%.

Panels 2200 and 2206 show simulations for $V_{max}$=0.5V, panels 2202 and 2208 show simulations for $V_{max}$=1V, and panels 2204 and 2210 show simulations for $V_{max}$=5V. This increase in conductance is due to formation of connections in the complex nanoparticle network, which mimics potentiation in biological neural networks: changes $N_R$ and in G provide complementary ways of characterising the level of potentiation or activation of the network.

Figure 23:
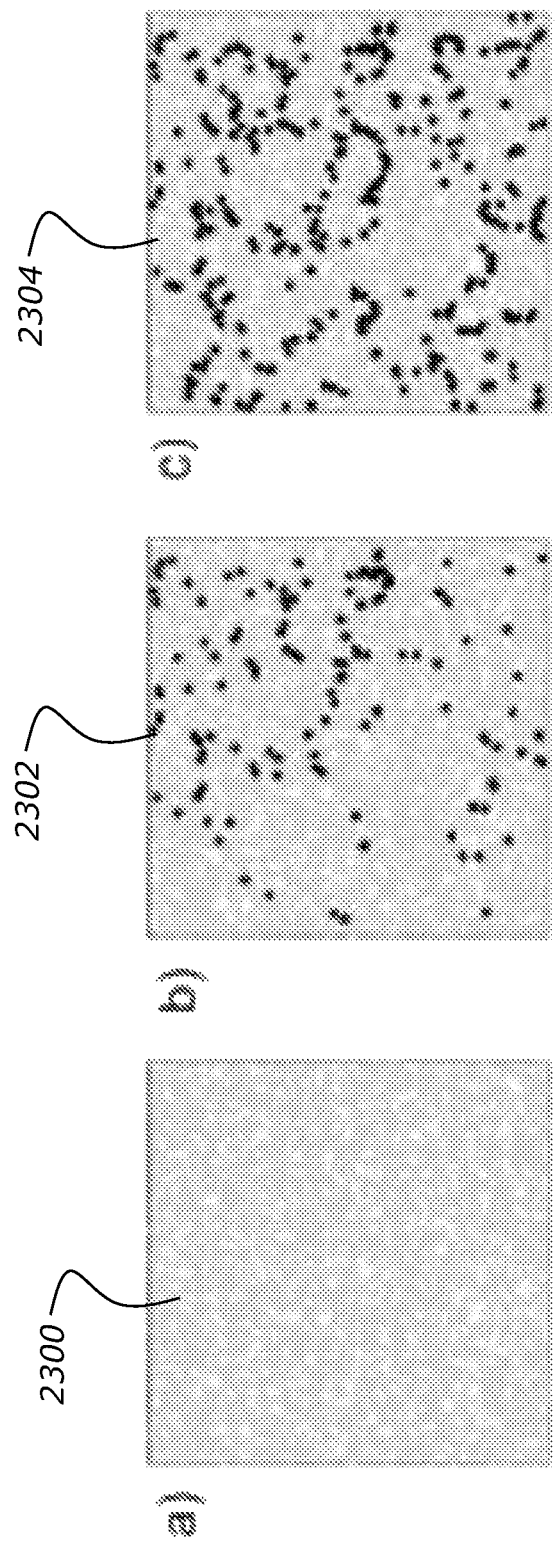
FIG. 23 shows an avalanche of successive switching events resulting from application of a constant voltage.

FIG. 23 illustrates the avalanche of successive switching events that results from application of a constant voltage (1V). Locations of switching events (black dots) are shown for a 100×100 subset of a 200×200 system of overlapping discs (grey) with p=0.55 for $N_V$=1 shown at 2300, $N_V$=2000 shown at 2302 and $N_V$=5500 shown at 2304, corresponding to the conductivity data in panel 2202 in FIG. 22.

In each case in FIG. 22, it is clear that an increase in P↑ leads to a faster increase in the number of replacements and consequently a faster increase in the conductance. The maximum conductance reached for each set of curves is clearly highest for the largest $V_{max}$, and at higher $V_{max}$, once $E_{th}$ is exceeded, there is a nearly exponential initial increase in both $N_R$ and G until eventually the last tunneling conductor on the primary conduction path between the contacts is replaced.

The points marked by coloured dots in FIG. 22 define a critical number of voltage steps, $N^c{}_V$, that is analogous to a new percolation threshold for the percolating system comprising tunnel gaps (empty sites) that are being replaced by Ohmic conductors (filled sites). At later times $N_R$ saturates both because most of the relevant tunnel gaps have already been replaced and because the existence of an Ohmic conductance path means that the voltage distribution across the system is relatively uniform and there are few opportunities to newly exceed $E_{th}$.

Figure 24:
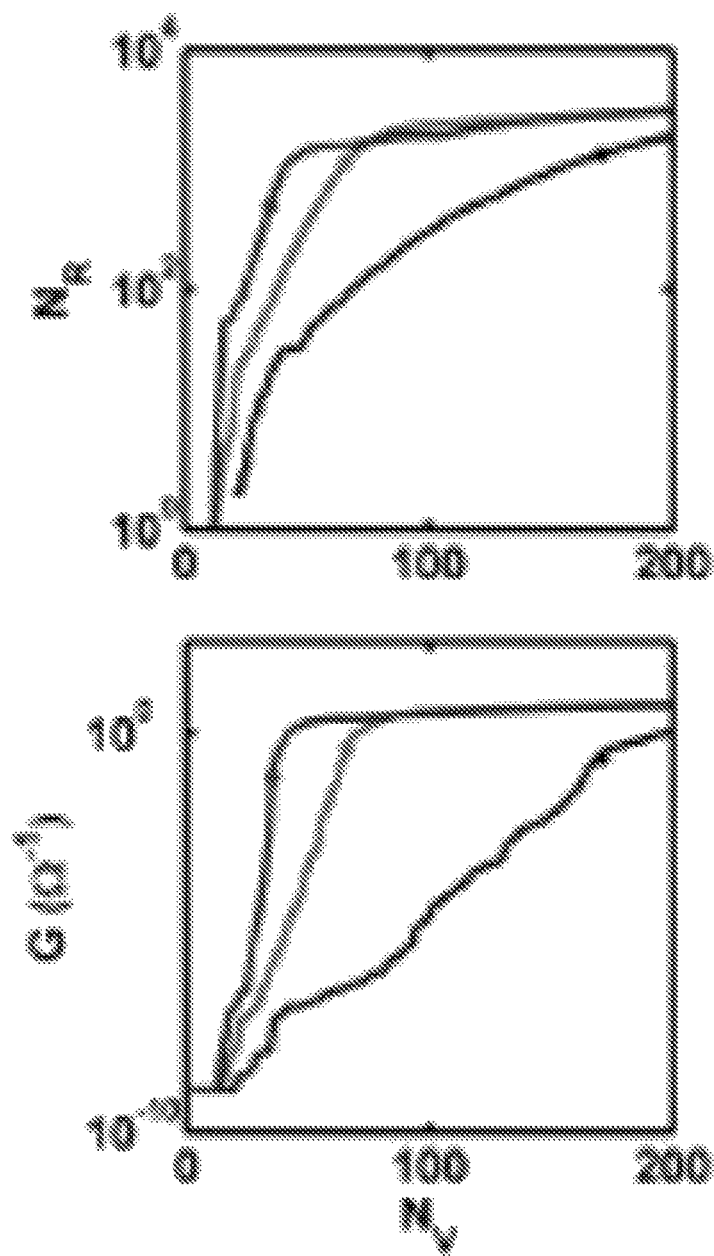
FIG. 24 shows the data from FIG. 22 on a linear horizontal scale.

FIG. 24 shows the data from panels 2204 and 2210 in FIG. 22 on a linear horizontal scale which emphasises the exponential initial increase in G and $N_V$ and shows that the apparently S-shaped conductance curves in FIG. 4 are in fact comprised of a nearly exponential region followed by a region of saturation: G saturates because $N_R$ is saturating.

Figure 25:
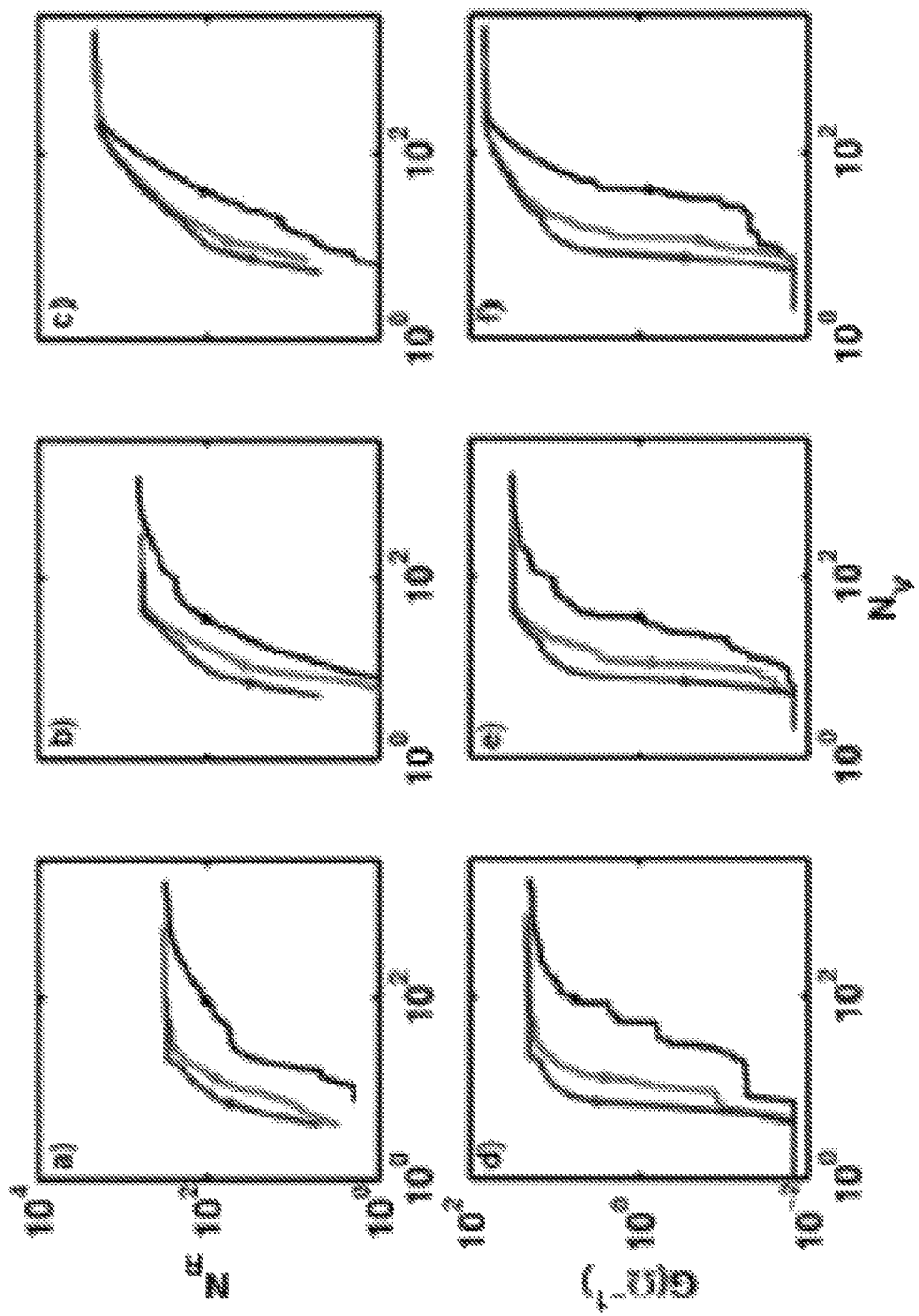
FIG. 25 shows the number of switching events and system conductance as a function of time at a higher coverage than that shown in FIG. 22.

FIG. 25 (p=0.65) shows similar general trends to FIG. 22, although note the dramatic decrease in the range of conductivities (change in G scale) compared to FIG. 22. The key difference is that because the coverage is higher, the initial conductance $G_{min}$ for each curve is many orders of magnitude larger than in FIG. 22 (whilst the final conductance $G_{max}$ is only slightly higher).

Figure 26:
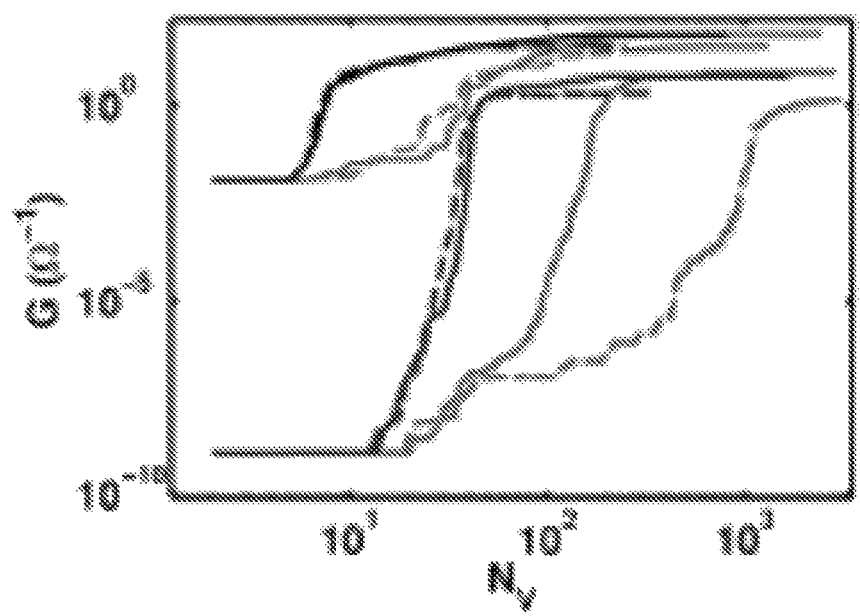
FIG. 26 compares the conductance as a function of the number of voltage steps for a range of parameter values.

FIG. 26 directly compares the conductance as a function of number of voltage steps for a range of parameter values: p=0.55 and 0.65, $V_{max}$=1V (dashed lines) and 5V (solid lines), and P↑=1% and 40%. From right to left: p=0.55, P↑=1%; p=0.55, P↑=40%; p=0.65, P↑=1%; p=0.65, P↑=40%. Clearly $G_{min}$ and $G_{max}$ are smaller for p=0.55 than for p=0.65 but another important difference is that the number of replacements required to create an Ohmic path is larger for p=0.55.

Increasing the probability of formation of a connection and the maximum applied voltage since increases in P↑ and $V_{max}$ both increase the rate at which connections are formed, and consequently the rate of increase of conductance is also increased. However the response to the ramped voltage does not scale trivially with time (equivalently $N_V$): in periods of decreasing voltage the rate of formation of connections is limited.

For $N_V > N^c{}_V$ the data in FIG. 24 (and also that in FIGS. 22 and 25) follows a power law behaviour in the conductance that is clearly distinct from the exponential behaviour in for $N_V < N^c{}_V$. The power law region can be explained qualitatively by the existence of an ohmic spanning group which grows in fashion which is dictated by the underlying structure of the connected switchable elements (which are themselves given by the underlying percolating structure of the film).

After the first Ohmic connection across the film is formed at $N^c{}_V$, further cycling of the voltage links a subset of the remaining groups to the spanning group, gradually approaching a saturation point, at which the conductance plateaus. The random insertion of $G_{Ohmic}$ resistors into the network of tunneling gaps is a kind of additional percolation process i.e. percolation of connections on top of the percolating network of particles.

Figure 27:
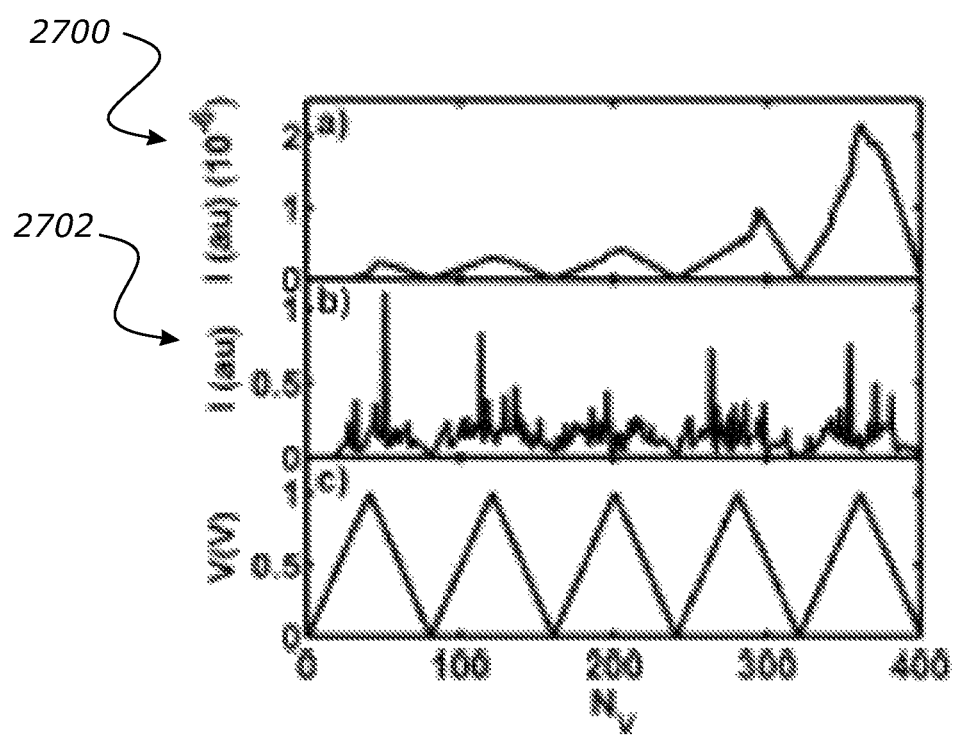
FIG. 27 shows the effect of including in the model the possibility that the atomic wires formed can subsequently be broken by electromigration.

FIG. 27 demonstrates the effect of including in the model the possibility that the atomic wires formed (probability P↑=1%) can subsequently be broken by electromigration. We assume that when the current in an atomic wire exceeds a threshold value Ith=0.1 the wire has a well-defined probability of being broken P↓ at each voltage step. When a wire is broken it is assumed that the original gap between particles reappears.

At 2700 (probability P↓=100%) is shown clear neuromorphic behaviour in the form of increases in current from cycle to cycle when the current threshold is not exceeded. In contrast the formation of atomic wires during the first cycle at 2702 in FIG. 27 results in much higher currents (because the number of series tunnel gaps is smaller) and electromigration immediately starts to remove the Ohmic conductors for which I>Ith. A dynamical equilibrium is obtained as wires repeatedly form and break, and the average current flowing in the subsequent cycles is approximately constant.

Figure 28:
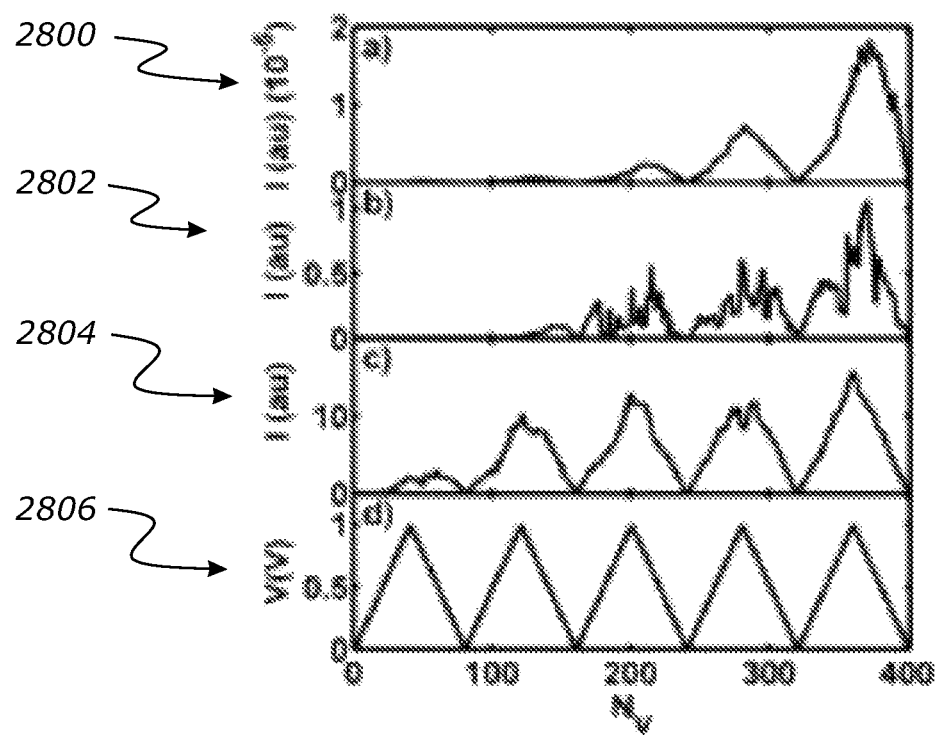
FIG. 28 shows the effect of including in the model the possibility that the atomic wires formed can subsequently be broken by electromigration at higher coverages than that shown in FIG. 27.

FIG. 28 shows a more realistic case where P↓=1% and p=0.55 (shown at 2800), p=0.60 (shown at 2802), p=0.65 (shown at 2804), corresponding voltage ramp (shown at 2806). As shown at 2700 in FIG. 27, for p=0.55 (shown at 2800 in FIG. 28) shows an increase in the tunneling current from cycle to cycle but the large series resistance means that electromigration is irrelevant.

At higher coverages shown at 2802 and 2804 in FIG. 28 the increases in current from cycle to cycle are faster, and the maximum current and conductance increase with p. Initially electromigration has only a limited impact and so it takes some time for a dynamic equilibrium to be established (after a relatively large number of cycles).

This learning behaviour is typical of neuromorphic systems and demonstrates that potentiation of a pathway of memristive elements/synapses is possible. This behaviour is very similar to that associated with recurrent connections/feed forward mechanisms in ANNs. Also, the inherent non-linearity in the tunnelling regime (e.g. shown at 2700 in FIG. 27), may be useful in providing functionality similar to that required for reservoir computing.

Further embodiments on optimisation of device performance are disclosed below.

Implementation of neuromorphic devices generally require multi-contact geometries where inputs to particular contacts potentiate different pathways within the system. There are a large number of possibilities for variations on this scenario.

The memristive elements disclosed herein include the use of Ag and Cu atomic switches (formed by electrochemical reduction of $Ag_2S$ or $Cu_2S$) and switching molecules (through chemical functionalisation of the nanoparticles).

Other embodiments include more complex switching elements, multiple synapses between neurons, multiple electrodes, more sophisticated pulsed inputs and multiple inputs with opposite polarity.

In an embodiment, a three-dimensional system allows further opportunities for forming connections between non-neighbouring groups of particles. By analogy with the 2D case, a volume occupancy just below the 3D percolation threshold (i.e. of 0.15 to 0.18) provides optimal neuromorphic behaviour in a 3D system where the deposited particles approximate a random packing of spheres. It be appreciated that the percolation threshold is dependent on the geometry and arrangement of particles.

In an embodiment switching elements such as atomic scale wires provide multiple conductance levels thereby enabling an additional type of neuromorphic behaviour similar to that achieved in biological systems where it is possible to form more than one connection between neural cells i.e. multiple synapses between the same pair of neurons resulting in an enhanced response to the stimulus from the incoming axon.

Disclosed below are techniques for optimisation of neuromorphic performance.

In an embodiment the width of an atomic wire changes with time or in response to repeated inputs. Such changes correspond to STP and LTP of individual synapses. Such variations of conductance have the potential to contribute an additional level of potentiation to the network.

Activation and/or potentiation of a pathway in the nanoparticle networks occurs for all surface coverages studied but the change in G is more dramatic for systems with low particle coverages because the number of tunnelling connections that must be traversed in order to span the system is large. As $p \rightarrow p_c$ the size of the connected groups of particles increases and they are connected via tunnel gaps to a larger number of other groups and so the networks are in a sense more complex, but the change in G is smaller.

This complexity close to a critical point is believed to be important for the functioning of the brain. In the disclosed embodiments the choice of the value of $G_{Ohmic}$ and parameters in equation 4 limits the extent to which the system can replicate behaviour of biological systems. It will be appreciated that multiple connections between groups are both possible and desirable.

In experiments on biological neurons and in neuromorphic computing one would expect to apply a series of voltage pulses (rather than the voltage ramps considered here) in order to cause potentiation. Numerically providing a series of voltage pulses is identical to recording the response of the system to a constant (i.e. DC) voltage except that one should then interpret $N_V$ as the number of voltage pulses (with constant height) rather than the number of voltage steps. Hence, the simulations indicate that potentiation of a pathway is expected in response to a series of voltage pulses (see discussion of STDP above).

Figure 29:
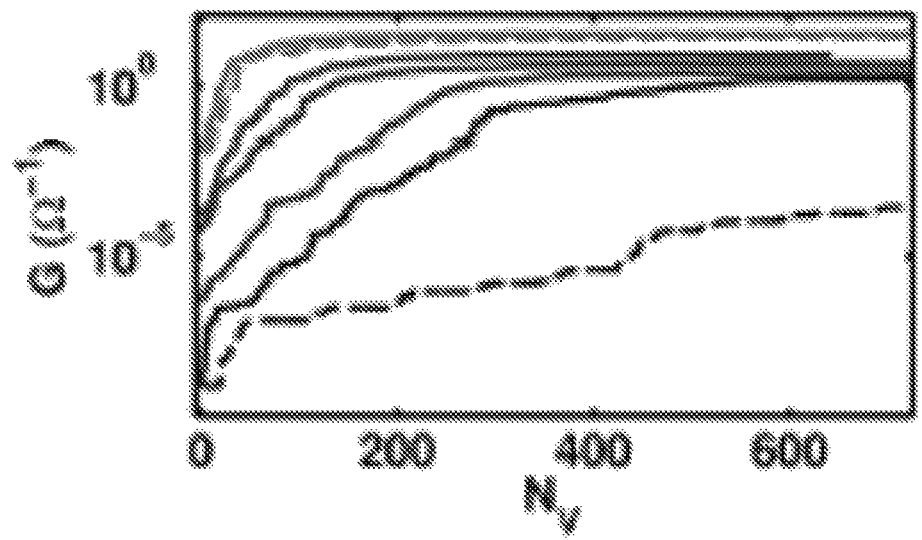
FIG. 29 shows conductance change at constant voltage.

FIG. 29 shows the conductance change at constant voltage (V=1V) for p=0.55, 0.57, 0.60, 0.62, 0.65. Dashed lines are from ramped voltages for comparison.

The results are qualitatively very similar to results from voltage ramps (compare with the dashed lines, corresponding to data from FIGS. 22 and 25), but it is clear that the effect of the down ramps is to extend the amount of time required to achieve a given system conductance—switching events are relatively rare during down ramps.

The practical voltage range in which switching is observed will depend on nanoparticle size and the system size, as well as the choice of material. It provides an opportunity in the nanoparticle system to controllably tune the level of potentiation that would be difficult to achieve in other systems. The nanoparticle and system sizes, and applied voltages are all experimentally controllable parameters that will affect the switching behaviour that will be observed.

The switching depends on the local electric field in individual nanogaps. There is an opportunity in the experimental systems to tune the switching by using the nanoparticle size or the system size to tune the electric field that is actually present for any given applied voltage. In addition, EFIE and EFISD occur at different electric fields for different materials.

The tunnel junctions that are formed at gaps in the percolating film, and that switch to a highly conducting state on formation of an atomic scale wire, behave differently than other types of memristors such as titanium oxide devices. The tunnel gaps are however memristive in that the device history determines its state. Switching occurs at a well-defined threshold value (of the electric field) but unlike other memristors cannot be switched back to the low conduction state by simply reversing the polarity of the bias voltage.

Figure 30:
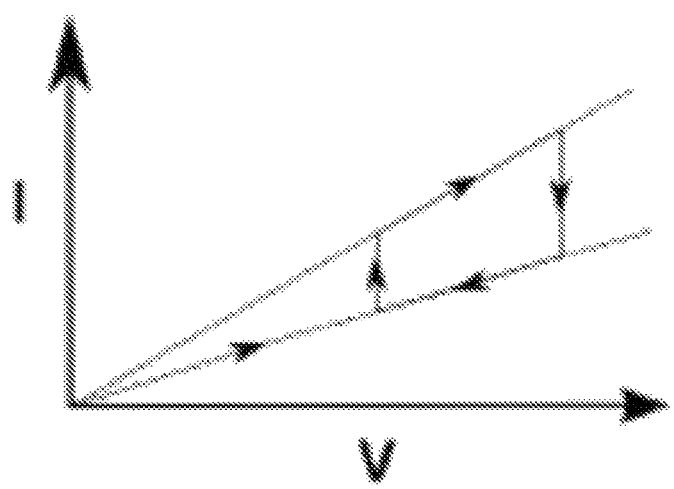
FIG. 30 shows schematic memristive switching between a low resistance state and a high resistance state.

Nevertheless as shown above this kind of 'once only' switching provides sufficient functionality to enable potentiation of the network and a cascade of switching events. As shown schematically in FIG. 30, once in the high conductance state, switching to the low resistance state occurs (due to electromigration) if the current exceeds some threshold value for long enough. It is assumed that even in the high resistance (tunneling) state resistor still obeys Ohm's law at low V.

In an embodiment, switching to the low resistance state is modelled as a stochastic process that occurs with probability $P\downarrow$, but it is clear that a slow voltage ramp that continues after the formation of the atomic wire will eventually cause the device to switch back to $G_{low}$ [if $P\downarrow=1$ then after 100 voltage steps, on average the device will be in the $G_{low}$ state].

Hence, viewed over a long enough timeframe, switching to $G_{low}$ occurs quasi-deterministically. Similarly, if the voltage is then ramped down at a similar rate (lower left-pointing arrow in FIG. 30, with the voltage remaining above $V_{th}$, a quasi-deterministic return to the high conductance state will occur due to formation of a new atomic scale wire.

Hence one embodiment protocol requires that after each switching event the voltage is ramped up again. A clockwise hysteresis loop is generated as shown schematically in FIG. 30. Usually memristive hysteresis loops are characterised by anti-clockwise paths on an I(V) plot. The direction of the hysteresis loop changes some of the detail of the required operational protocols.

In an embodiment, hysteresis loops are either clockwise or counterclockwise depending on the relative positions of the thresholds $V_{th}$ and $I_{th}$. It is possible to generate classic memristive hysteresis loops. After the initial increase in conductance shown in FIG. 30, the voltage is decreased and the current is reduced so that electromigration can be eliminated.

Large negative voltages are applied so that sufficient current will be generated so as to break the connection and cause a return to the high resistance state, thus achieving anti-clockwise memristive loops similar to those observed in other memristive devices. In this protocol one uses large voltage pulses to switch states and small (sub threshold) voltage pulses to read the state of the devices.

Other embodiments involve devices fabricated with percolating silver or copper nanoparticles that are sulphidised, allowing neuromorphic devices based on percolating circuits and electrochemical reduction of $Ag_2S$ to Ag or $Cu_2S$ to Cu. In an embodiment, switching molecules are incorporated such as azobenzenes, rotaxanes, and other molecular switches. Such hybrid percolating/molecular systems have the potential to allow additional and novel design parameters to be developed, with more complex functionality.

The foregoing description of the invention includes preferred forms thereof. Modifications may be made thereto without departing from the scope of the invention, as defined by the accompanying claims.

The invention claimed is:

1. A neuromorphic percolating network comprising:
   a substrate having at least two electrical contacts;
   a plurality of nanoparticles deposited on the substrate between at least two of the at least two electrical contacts, at least some of the nanoparticles directly connected to each other to form groups of nanoparticles, the surface coverage of the nanoparticles within a tolerance of a percolation threshold;

a plurality of gaps separating the nanoparticles and groups of nanoparticles; and a plurality of memristive elements located at least partially in respective gaps between the nanoparticles, or the groups of nanoparticles, that are not otherwise directly connected to each other, the memristive elements, the nanoparticles and the groups of nanoparticles providing at least one persistent pathway of increased activity, the at least one persistent pathway of increased activity comprising at least one persistent pathway that includes a plurality of memristive elements whose switching rate or likelihood of switching is increased.

2. The network of claim 1 wherein the at least one persistent pathway of increased activity comprises at least one persistent pathway of increased conductivity.

3. The network of claim 1 wherein the at least one persistent pathway of increased activity is between two of the at least two electrical contacts.

4. The network of claim 1 wherein at least some of the nanoparticles are at least partially oxidised so as to limit the extent of coalescence of the nanoparticles.

5. The network of claim 1 wherein at least some of the nanoparticles are conducting.

6. The network of claim 1 wherein at least some of the nanoparticles have resultant diameters in the range 5 nm to 50 nm.

7. The network of claim 1 wherein the nanoparticles comprise one or more of the group comprising Sn, Bi, Au, Pb, Ag, Cu and an alloy of one of more of the foregoing.

8. The network of claim 1 wherein the percolation threshold comprises a surface coverage of 0.68, the tolerance for the surface coverage of the nanoparticles comprising a range of 0.40 to 0.70.

9. The network of claim 8 wherein the tolerance for the distribution of the nanoparticles comprises a range of 0.5 to 0.68.

10. The network of claim 8 wherein the tolerance for the surface coverage of the nanoparticles comprises a range of 0.55 to 0.68.

11. The network of claim 1 wherein the percolation threshold comprises 0.68, the tolerance for the surface coverage of the nanoparticles comprising a range of 0.62 to 0.72.

12. The network of claim 1 wherein the memristive elements comprise gaps which are tunnel gaps providing a low conductance state in an off state and atomic scale wires in the tunnel gaps providing a high conductance state in an on state.

13. The network of claim 12 wherein the atomic wires are formed in response to a voltage applied between the at least two electrical contacts, the voltage comprising a voltage ramp, a voltage pulse, or a series of voltage pulses.

14. The network of claim 12 wherein the atomic wires are formed in response to a current applied between the at least two electrical contacts.

15. The network of claim 12 wherein the atomic wires are formed in response to electric field driven migration, electric field driven evaporation, electrochemical reduction, and/or electrochemical oxidation.

16. The network of claim 1 wherein the substrate is non-conducting, insulating, or semi-conducting.

17. The network of claim 1 wherein at least part of the substrate comprises a substantially planar surface.

18. The network of claim 1 wherein at least part of the substrate comprises a substantially curved surface.

19. The network of claim 1 wherein at least part of the substrate has an RMS surface roughness of less than 1 nm.

20. The network of claim 1 wherein the at least one memristive element comprises one or more of the group comprising: Ag/AgS electrochemical switches, switching molecules, and standard metal oxide memristor switching elements devices.

21. The network of claim 1 wherein the nanoparticles are functionalised with molecules.

22. The network of claim 1 wherein the molecules are able to switch between two states with well defined and distinct resistances.

23. The network of claim 22 wherein the molecules comprise one or more of the group comprising: azobenzenes, rotaxanes, and other molecular switches.

24. The network of claim 1 wherein at least some of the nanoparticles comprise Ag or Cu particles and are at least partially sulphidised.

25. The network of claim 24 wherein at least some of the atomic scale conducting wires comprise atomic scale silver or copper wires.

* * * * *